(12) United States Patent
McBride

(10) Patent No.: US 11,034,890 B2
(45) Date of Patent: Jun. 15, 2021

(54) INSULATED VESSELS, INSULATION SYSTEMS THEREFORE, AND METHODS OF INSTALLING SAME

(71) Applicant: INSULTHERM, INC., La Porte, TX (US)

(72) Inventor: Jonathan McBride, La Porte, TX (US)

(73) Assignee: INSULTHERM, INC., La Porte, TX (US)

( * ) Notice: Subject to any disclaimer, the term of this patent is extended or adjusted under 35 U.S.C. 154(b) by 15 days.

(21) Appl. No.: 16/436,463

(22) Filed: Jun. 10, 2019

(65) Prior Publication Data

US 2019/0292465 A1    Sep. 26, 2019

Related U.S. Application Data

(62) Division of application No. 15/491,637, filed on Apr. 19, 2017, now Pat. No. 10,323,190.

(Continued)

(51) Int. Cl.
*C10B 55/00* (2006.01)
*B65D 90/02* (2019.01)
(Continued)

(52) U.S. Cl.
CPC ............... *C10B 1/04* (2013.01); *B65D 90/06* (2013.01); *C10B 55/00* (2013.01); *F16L 59/12* (2013.01); *B65D 90/02* (2013.01); *F16L 59/13* (2013.01)

(58) Field of Classification Search
CPC ...... B65D 90/02; B65D 90/027; B65D 90/06; F16L 59/12; F16L 59/13; C10L 355/00
See application file for complete search history.

(56) References Cited

U.S. PATENT DOCUMENTS 711,026 A     10/1902  Updike
1,688,868 A   10/1928  Horton
(Continued)

FOREIGN PATENT DOCUMENTS

CN    201785346 U    4/2011

OTHER PUBLICATIONS

"MONEL® alloy 400 (UNS N04400)", HPAlloys, Mar. 9, 2015 (date obtained from wayback machine), URL: https://www.hpalloy.com/Alloys/descriptions/MONEL400.aspx (Year: 2015).*

(Continued)

*Primary Examiner* — Jonathan Luke Pilcher
(74) *Attorney, Agent, or Firm* — Jeffrey L. Wendt; The Wendt Firm PC

(57) ABSTRACT

An insulated pressure vessel, such as a coke drum, having an insulation system installed thereon. The insulation system includes an insulation support system comprising either a floating ring type support system, or a cage type support system including a plurality of vertically spaced insulation support rings each having a diameter greater than the external diameter of the coke drum. A plurality of insulation panels are secured to the support rings, each panel including insulation material and an exterior metal jacket. The panels are secured to horizontally adjacent insulation panels with standing seams. Weather shields may be provided over the top of the seams. Tensioned insulation securing cables, corresponding in number to the insulation support rings, are routed through horizontally aligned eyelets in each standing seam.

17 Claims, 15 Drawing Sheets

Related U.S. Application Data

(60) Provisional application No. 62/327,830, filed on Apr. 26, 2016.

(51) Int. Cl.
*B65D 90/06* (2006.01)
*F16L 59/12* (2006.01)
*F16L 59/13* (2006.01)
*C10B 1/04* (2006.01)

(56) References Cited

U.S. PATENT DOCUMENTS

| | | | |
|---|---|---|---|
| 1,757,988 | A | 5/1930 | Wilhelm |
| 2,209,420 | A | 7/1940 | Rutten et al. |
| 2,323,297 | A | 7/1943 | Collins |
| 2,501,951 | A | 3/1950 | Lintz |
| 2,561,461 | A | 7/1951 | Coleman, Jr. |
| 2,596,738 | A | 5/1952 | Thomas |
| 2,731,334 | A | 1/1956 | Wissmiller et al. |
| 2,738,094 | A | 3/1956 | Fowler |
| 2,775,594 | A | 12/1956 | Shea, Jr. |
| 2,955,686 | A | 10/1960 | Blomeley et al. |
| 3,312,028 | A | 4/1967 | Schroyer |
| 3,363,889 | A | 1/1968 | Shirley et al. |
| 3,456,835 | A | 7/1969 | Marcmann |
| 3,519,256 | A | 7/1970 | Heisterkamp |
| 3,555,758 | A | 1/1971 | Schroter |
| 3,820,292 | A | 6/1974 | Fitzpatrick |
| 3,945,236 | A | 3/1976 | Hooper |
| 3,948,412 | A | 4/1976 | Bennett |
| 4,004,394 | A | 1/1977 | Bennett |
| 4,004,429 | A | 1/1977 | Mouton, Jr. |
| 4,044,517 | A | 8/1977 | Schroter |
| 4,122,640 | A | 10/1978 | Commins et al. |
| 4,181,235 | A | 1/1980 | Baysinger |
| 4,223,797 | A | 9/1980 | Skakunov |
| 4,225,055 | A | 9/1980 | Hills et al. |
| 4,230,293 | A | 10/1980 | Hamm et al. |
| 4,338,756 | A | 7/1982 | Crothers |
| 4,347,949 | A | 9/1982 | Bennett |
| 4,442,639 | A | 4/1984 | Lindsey et al. |
| 4,534,490 | A | 8/1985 | McBride |
| 4,577,839 | A | 3/1986 | Carlson et al. |
| 4,649,680 | A | 3/1987 | Weisner et al. |
| 5,263,603 | A | 11/1993 | McBride |
| 9,243,416 | B2 | 1/2016 | Chism et al. |
| 10,302,253 | B2 | 5/2019 | McBride |
| 10,323,190 | B2 | 6/2019 | McBride |
| 2018/0201839 | A1 | 7/2018 | McBride |
| 2018/0202607 | A1 | 7/2018 | McBride |

OTHER PUBLICATIONS

"MONEL® alloy 400", Special Metals, Feb. 5, 2005, URL: https://www.specialmetals.com/assets/smc/documents/alloys/monel/monel-alloy-400.pdf (Year: 2005).*

Lieberman, N.P., "Troubleshooting Refinery Processes", PennWell Publishing (Tulsa, OK), Chapter 2, "Delayed Coking Cycles", pp. 18-39 (1981).

Lieberman, N.P., "Troubleshooting Refinery Processes", PennWell Publishing (Tulsa, OK), Chapter 3, "Delayed Coking Process", pp. 40-50 (1981).

Armatherm(TM) 500 brochure, pp. 1-2, Armadillo NV, Fairhaven, Massachusetts, (accessed on the Internet Mar. 6, 2016, downloaded from the Internet Aug. 8, 2017).

CX-1 Precision Tension Measurements, pp. 1-8, Tensitron, accessed and downloaded from the Internet Mar. 6, 2016.

Ellis, P.J. et al., "Tutorial: Delayed Coking Fundamentals", pp. 1-20, Great Lakes Carbon Corporation, prepared for Presentation at the AIChE 1998 Spring National Meeting, New Orleans, LA, Mar. 8-12, 1998, unpublished, accessed and downloaded for the Internet Mar. 5, 2017.

Jechura, J., "Delayed Coking", Chapter 5, pp. 1-34, Colorado School of Mines, Jan. 26, 2016, accessed and downloaded form the Internet Mar. 5, 2016.

Loos & Co., Inc., "7x7 MC31377 Commercial Aircraft Cable Flexible Preformed MONEL 400" Product Technical Data Sheet, accessed and downloaded from the Internet Mar. 4, 2016.

Loos & Co., Inc., "7x19 MC31379 Commercial Aircraft Cable Flexible Preformed MONEL 400" Product Technical Data Sheet, accessed and downloaded from the Internet Mar. 4, 2016.

MONEL(R) Alloy 400 product brochure, pp. 1-16, Special Metals Corporation, accessed and downloaded from the Internet Mar. 4, 2016.

Espacenet translation of WU et al. (CN 201785346) (Year 2011).

"Single Lock Standing SeamPanel System Installation Guide", VMZINC, May 7, 2009, available online at: http://www.vmzinc-us.com/images/vmzinc/documentations/documents/Installation_Guide_SingleLockStandingSeam.pdf (Year: 2009).

Williams et al., "Flexible Aerogel Insulation for Coker- and Sulfur-Unit Applications", Coking.com, Sep. 2010, Available at: https://refinigncommunity.com/wp-content/uploads/2017/06/Flexible-Aerogel-Insulation-for-Coker-and-Sulfur-Unit-Applications-Willimas-Seipp-Aspen-Aerogels-DCU-Calgary-2010.pdf.

McBride, "Coke Drum Insulation", Coking.com, May 2011, Available online at: https://retiningcommunity.com/wp-content/uploads/2017/07/Coke-Drum-Insulation-McBride-Insultherm-DCU-Galveston-2011.pdf (Year: 2011).

USPTO, Office Action dated Dec. 26, 2018, U.S. Appl. No. 15/491,637 (now U.S. Pat. No. 10,323,190), pp. 1-24.

Jeffrey L. Wendt, Amendment and Response to USPTO Office Action dated Dec. 26, 2018, U.S. Appl. No. 15/491,637 (now U.S. Pat. No. 10,323,190), pp. 1-16, filed in the USPTO Mar. 19, 2019.

USPTO, Notice of Allowance dated Apr. 23, 2019, U.S. Appl. No. 15/491,637 (now U.S. Pat. No. 10,323,190), pp. 1-22.

Jeffrey L. Wendt, Preliminary Amendment for U.S. Appl. No. 15/617,752, (now U.S. Pat. No. 10,302,253), pp. 1-9, filed Feb. 27, 2019.

USPTO, Notice of Allowance dated Mar. 28, 2019, U.S. Appl. No. 15/617,752 (now U.S. Pat. No. 10,302,253), pp. 1-51.

* cited by examiner

INSULATED VESSELS, INSULATION SYSTEMS THEREFORE, AND METHODS OF INSTALLING SAME

CROSS-REFERENCE TO RELATED APPLICATIONS

The present application claims benefit of and priority to U.S. provisional patent application No. 62/327,830, filed Apr. 26, 2016, and U.S. nonprovisional patent application Ser. No. 15/491,637, filed Apr. 19, 2017, both incorporated herein by reference in their entireties.

BACKGROUND INFORMATION

Technical Field

The present disclosure relates to insulated vessels, insulation systems therefore, and methods of installing same. More particularly, the present disclosure relates to insulated coke drums.

Background Art

A "coke drum" is part of a "coker unit", a key operational unit in the petroleum refining process. Using heat and pressure, a coke drum turns crude oil into lighter products, such as gasoline, diesel and jet fuel. The remaining material is called "coke", which is similar to charcoal. In many older refineries, existing coke drums are reaching the end of their useful life and must be replaced.

Coke drums typically operate at temperatures ranging from about 800° F. to about 950° F., with cracking reactions beginning at about 800° F., typically reached in a fired heater upstream of the coke drums. "Delayed coking" is the term used to describe coking that occurs in the coke drums. The four aspects of coke quality that affect price are sulfur, metals, hardness (measured by volatile combustible matter—VCM, where the higher the VCM the lower the hardness), and physical structure. The coker unit operator has little or no control over sulfur, metals, and physical structure, but can have a major influence on hardness of the coke. Petroleum coke sold for fuel may have a high VCM, while coke sold for calcining must have a low VCM (10-13%). Making coke too soft (high VCM) leads to potential foam-over problems and increased coke yields at the expense of more valuable gas oil. Hard coke (low VCM) takes longer to cut.

The VCM of coke is primarily a function of coke drum overhead vapor temperature. A very high transfer-line temperature (930° F.) will not make hard coke if the drum insulation has deteriorated and the vapor line is only running at 770° F. One cause of soft coke is poor drum insulation. A few hours in to the filling cycle, the temperature difference between the transfer line and vapor line ought not to be more than about 110° F. A greater difference may indicate inadequate drum insulation. Water may have penetrated underneath the weatherproofing and soaked the insulation, thus reducing its effectiveness. Lieberman, *Troubleshooting Refinery Processes*, p. 44, 3rd Ed., PennWell Publishing Company (1991).

U.S. Pat. No. 4,534,490, assigned to the assignee of the present disclosure, describes insulation panels employing rolled-over standing seams, and references other patents, such as U.S. Pat. Nos. 2,323,297; 2,501,951; 3,456,835; 4,004,394; 4,044,517; 4,338,756; 4,347,949; and 4,122,640. See also U.S. Pat. Nos. 711,026; 1,757,988; 2,561,461; 2,596,738; 2,955,686; 3,363,889; 3,519,256; 4,649,680; 5,263,603; and 9,243,416, and Chinese patent document CN201785346U.

As may be seen, there remains a need for more robust insulation panel designs, particularly for coke drums and other pressure vessel and storage tanks, allowing thermal movement while having stainless steel or other metal outer shell combined with a standing seam that provides a weather proof, durable, maintenance-free coke drum insulation. The insulation systems and methods of the present disclosure are directed to these needs.

SUMMARY

In accordance with the present disclosure, improved coke drum insulation panel designs, insulated coke drums, and methods of installation of insulation on coke drums and other vessels are provided that overcome some or all of the deficiencies of previous designs. An insulation support ring designed to "float", and therefore referred to sometimes as an "internal floating ring", holds the insulation panel system off the drum allowing drum movement without damaging the insulation. The screw attachment to the floating ring and a rain-shielded standing seam feature combine to create insulation panels allowing panel removal and/or replacement during weld seam inspection of the underlying vessel. The panels may be designed and manufactured to allow ease of handling by use optional handles when installing a series of panels, and allow thermal movement of the underlying pressure vessel.

A first aspect of the disclosure is an insulated coke drum comprising (or consisting essentially of, or consisting of):

(a) a coke drum having an external diameter, an exterior surface, and a longitudinal axis;

(b) an insulation system installed on the coke drum exterior surface, the insulation system comprising:

i) an insulation support system comprising a series of spaced apart weldments (preferably vertical, rectangular CS plates, or "clips") welded to the coke drum exterior surface in spaced apart horizontal rows, and a plurality of vertically spaced insulation support rings supported by but not attached to the weldments, each support ring having a diameter greater than the external diameter of the coke drum;

ii) a plurality of insulation panels secured to the support rings, each insulation panel comprising insulation material and an exterior metal jacket, each insulation panel positioned between horizontally adjacent insulation panels with single-folded standing seams; and iii) a plurality of tensioned insulation securing cables corresponding in number to the plurality of support rings, the cables routed through horizontally aligned eyelets in each standing seam (the eyelets preferably near the bottom of each standing seam).

A second aspect of the disclosure is an insulated coke drum similar to the first aspect, but rather the insulation support system comprising a series of spaced apart weldments welded to the coke drum exterior surface in spaced apart horizontal rows, the plurality of vertically spaced insulation support rings are supported by a plurality of laterally spaced apart brackets, each bracket in turn secured to and supported by one of a plurality of vertical steel bands. The steel bands are in turn supported near the top of the coke drum by a collar. This second aspect also includes a plurality of insulation panels secured to the support rings, each insulation panel comprising insulation material and an exterior metal jacket, each insulation panel positioned between horizontally adjacent insulation panels with single-folded standing seams, and a plurality of tensioned insulation securing cables corresponding in number to the plurality of support rings, the cables routed through horizontally aligned eyelets in each standing seam (the eyelets preferably near the bottom of each standing seam).

Another aspect of the present disclosure is an insulation system or kit comprising (or consisting essentially of, or consisting of):

i) an insulation support system comprising a series of weldments (preferably vertical, rectangular CS plates, or "clips") adapted to be welded to an exterior surface of a vessel in spaced apart horizontal rows, and a plurality of insulation support rings adapted to be vertically spaced and supported by but not attached to the weldments, each support ring having a diameter greater than the external diameter of the vessel to be insulated;

ii) a plurality of insulation panels adapted to be secured to the support rings, each insulation panel comprising insulation material and an exterior metal jacket, each insulation panel adapted to be positioned between horizontally adjacent insulation panels with single-folded standing seams; and iii) a plurality of tensionable insulation securing cables corresponding in number to the plurality of support rings, the cables adapted to be routed through horizontally aligned eyelets in each standing seam (the eyelets preferably near the bottom of each standing seam).

Another aspect of the disclosure is an insulation system or kit similar to the first kit, but rather the insulation support system comprising a series of spaced apart weldments welded to the coke drum exterior surface in spaced apart horizontal rows, the kit comprises (or consists essentially of, or consists of) a plurality of vertically spaced insulation support rings adapted to be supported by a plurality of laterally spaced apart brackets, each bracket in turn configured to be secured to and supported by one of a plurality of vertical steel bands. The steel bands are in turn configured to be supported near the top of the coke drum by a collar. This second kit aspect also includes a plurality of insulation panels adapted to be secured to the support rings, each insulation panel comprising insulation material and an exterior metal jacket, each insulation panel positioned between horizontally adjacent insulation panels with single-folded standing seams, and a plurality of tensioned insulation securing cables corresponding in number to the plurality of support rings, the cables routed through horizontally aligned eyelets in each standing seam (the eyelets preferably near the bottom of each standing seam).

The systems and kits of the present disclosure may also include other features, described herein such as weather shields and handles for ease of handling.

Yet another aspect of the present disclosure is a method of insulating a pressure vessel (for example a coke drum, reactor, or other pressure vessel, or a storage tank, and the like) comprising (or consisting essentially of, or consisting of):

(a) attaching an insulation support structure to an external surface of the pressure vessel, the insulation support structure configured to allow the pressure vessel to expand and contract without damage to the pressure vessel;

(b) attaching a plurality of insulation panels to the insulation support structure; and (c) securing the plurality of insulation panels to the insulation support structure and to the pressure vessel using a plurality of tensioned insulation securing cables tensioned to a least 450 lb wherein each of the tensioned insulation securing cables is selected from stainless steel and a solid-solution alloy having a melting point range of 2370 to 2460° F. (1300 to 1350° C.) consisting essentially of (or consisting of) from 28 to 34 percent copper, a minimum of 63 percent nickel, a maximum of 2.0 percent manganese, a maximum of 2.5 percent iron, a maximum of 0.3 percent carbon, a maximum of 0.024 percent sulfur, and a maximum of 0.5 percent silicon. In one embodiment, step (b) includes forming a plurality of single-folded standing seams between adjacent insulation panels, and forming an eyelet through-hole in a lower section of each standing seam, and step (c) comprises passing one of the insulation securing cables through a plurality of the eyelets on a plurality of horizontal levels, and tensioning the cables to said tension of at least 450 lb.

An important feature of the insulated coke drums, insulation systems or kits, and methods disclosed herein is the thermal movement allowed, that is, the drum or pressure vessel is allowed to expand and contract without damage to the coke drum, pressure vessel or insulation. Another advantage is the provision of the flexible, corrosion-resistant tensioned cables on the exterior of the insulation, allowing personnel to check the tension of the cables. The insulation panels may be easily removed in order to allow for inspection of the underlying pressure vessel, such as weld seams.

These and other features of the insulated coke drums, insulation systems or kits, and methods of the disclosure will become more apparent upon review of the brief description of the drawings, the detailed description, and the claims that follow. It should be understood that wherever the term "comprising" is used herein, whether describing an embodiment or a component or step of an embodiment, other alternative embodiments, components, and steps where the term "comprising" is substituted with "consisting essentially of" are explicitly disclosed herein. It should be further understood that wherever the term "comprising" is used herein, other alternative embodiments, components, and steps where the term "comprising" is substituted with "consisting of" are explicitly disclosed herein. Moreover, the use of negative limitations is specifically contemplated; for example, certain insulation support systems and methods may comprise a number of physical components and features, but may be devoid of certain optional hardware and/or other features. For example, certain systems of this disclosure are devoid of weldments welded to the coke drum or pressure vessel being insulated. Further, a component may be devoid of passages, cavities, slots, and the like, in other words, may be a solid piece.

BRIEF DESCRIPTION OF THE DRAWINGS

The manner in which the objectives of this disclosure and other desirable characteristics can be obtained is explained in the following description and attached drawings in which:

It is to be noted, however, that the appended drawings of FIGS. 1-9 and 11-17 may not be to scale, and illustrate only typical apparatus embodiments of this disclosure. Furthermore, FIG. 10 illustrates only one of many possible methods of this disclosure for installing insulation panels on a coke drum in accordance with the present disclosure. Therefore, the drawing figures are not to be considered limiting in scope, for the disclosure may admit to other equally effective embodiments.

DETAILED DESCRIPTION

Figure 1:
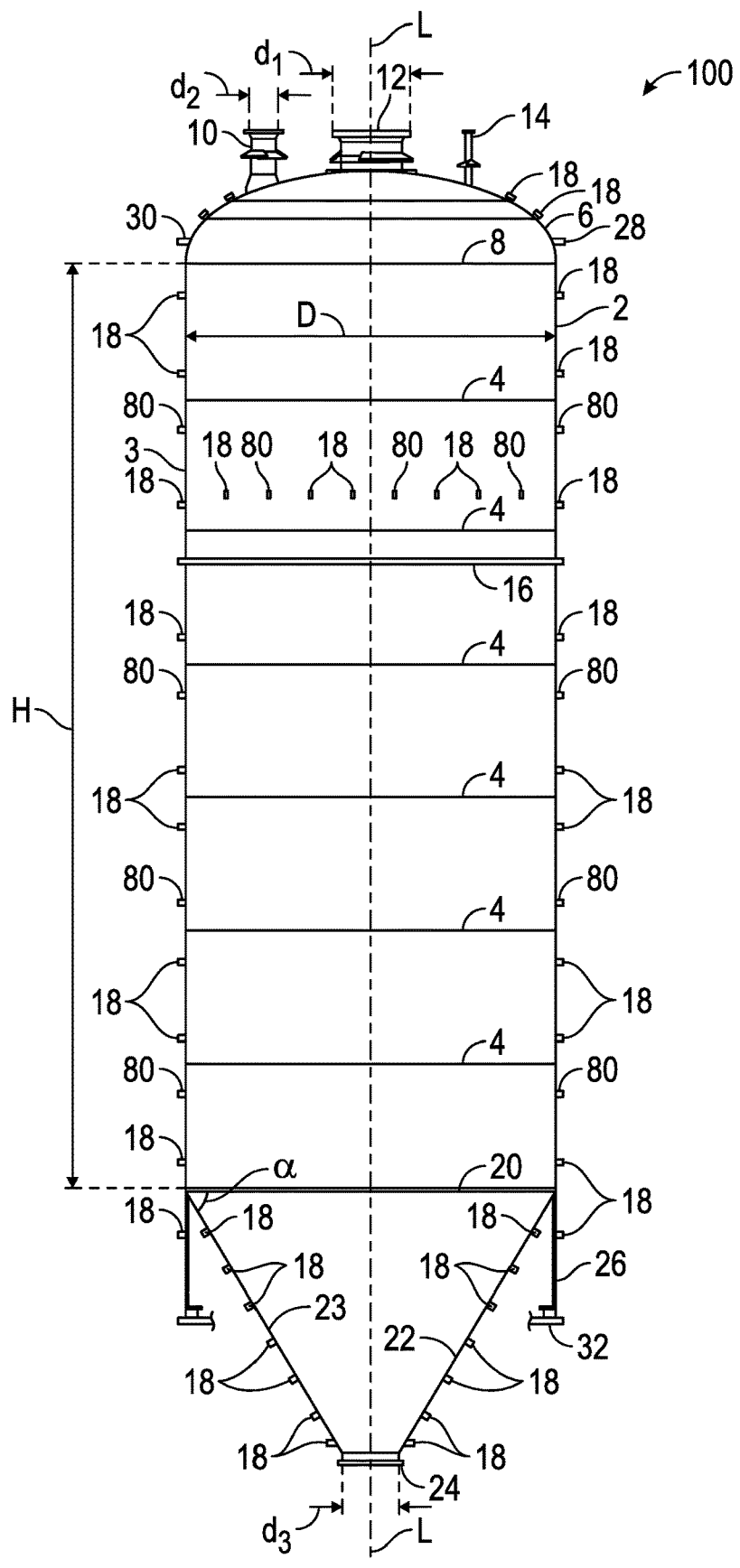
FIG. 1 is a schematic side elevation view, partly in cross-section, of one embodiment of a non-insulated coke drum, prior to installation of insulation panels, illustrating certain features of insulation support systems in accordance with the present disclosure.

In the following description, numerous details are set forth to provide an understanding of the disclosed insulated coke drums, insulation systems and kits, and methods. However, it will be understood by those skilled in the art that the insulated coke drums, insulation systems and kits, and methods disclosed herein may be practiced without these details and that numerous variations or modifications from the described embodiments may be possible. All U.S. published patent applications and U.S. patents referenced herein are hereby explicitly incorporated herein by reference, irrespective of the page, paragraph, or section in which they are referenced. Compositions are on weight percent basis unless otherwise specified.

A first aspect of the disclosure is an insulated coke drum comprising (or consisting essentially of, or consisting of):

(a) a coke drum having an external diameter, an exterior surface, and a longitudinal axis;

(b) an insulation system installed on the coke drum exterior surface, the insulation system comprising (or, in the alternative, consisting essentially of, or consisting of):

i) an insulation support system comprising a series of spaced apart weldments (preferably vertical, rectangular CS plates, or "clips") welded to the coke drum exterior surface in spaced apart horizontal rows, and a plurality of vertically spaced insulation support rings supported by but not attached to the weldments, each support ring having a diameter greater than the external diameter of the coke drum;

ii) a plurality of insulation panels secured to the support rings, each insulation panel comprising insulation material and an exterior metal jacket, each insulation panel positioned between horizontally adjacent insulation panels with single-folded standing seams; and iii) a plurality of tensioned insulation securing cables corresponding in number to the plurality of support rings, the cables routed through horizontally aligned eyelets in each standing seam.

In certain embodiments the weldments (sometimes referred to as support clips) attached to the exterior surface of the coke drum may be vertical, rectangular, planar metal plates extending perpendicular to the exterior surface of the coke drum. In certain embodiments the vertical, rectangular, planar metal plates extending perpendicular to the exterior surface of the coke drum may each have same thickness and comprise an upper planar member and a lower planar member having a common base welded to the exterior surface of the coke drum, the upper and lower planar members separated by a horizontal slot. In certain other embodiments the vertical, rectangular, planar metal plates extending perpendicular to the exterior surface of the coke drum may each have same thickness and may be solid plates devoid of slots or other passages. Certain insulated coke drums may include some of each type of support clip. In certain embodiments, the support clips may have other shapes, for example cylindrical rod-shaped members; chevron-shaped members (single and multiple chevrons); V-shaped and U-shaped, wherein the vertex of the V or bottom of the U is welded to the pressure vessel, and the legs of the V or U extend away from the pressure vessel, and the like.

As noted herein, another system of the disclosure is an insulated coke drum similar to the first aspect, but rather the insulation support system comprising a series of spaced apart weldments welded to the coke drum exterior surface in spaced apart horizontal rows, the plurality of vertically spaced insulation support rings are supported by a plurality of laterally spaced apart brackets, each bracket in turn secured to and supported by one of a plurality of vertical steel bands. The steel bands are in turn supported near the top of the coke drum by a collar. This second aspect also includes a plurality of insulation panels secured to the support rings, each insulation panel comprising insulation material and an exterior metal jacket, each insulation panel positioned between horizontally adjacent insulation panels with single-folded standing seams, and a plurality of tensioned insulation securing cables corresponding in number to the plurality of support rings, the cables routed through horizontally aligned eyelets in each standing seam (the eyelets preferably near the bottom of each standing seam).

In certain embodiments the rings may each comprise a horizontal ring attached at a distal edge to a top edge of a downward extending vertical ring, the horizontal ring having a width sufficient to support upwardly extending insulation panels, and the vertical ring having a height sufficient to secure an upper portion of downwardly extending insulation panels and accommodate a plurality of threaded members securing the vertical ring to the upper portion of the downwardly extending insulation panels.

In certain embodiments the horizontal rings may comprise anti-rotation members welded or otherwise attached to (or formed on) an under-side of the horizontal ring in the vicinity of at least some of the vertical, rectangular, planar metal plates having slots, the anti-rotation members configured to resist rotation of the rings about an axis perpendicular to the longitudinal axis of the coke drum and extending through the slot. In certain embodiments the anti-rotation members may be small metal plates, angle iron, or other shaped components (spheres, hemispheres, cups) welded to the underside of the horizontal ring, or may be bolts threaded into the horizontal ring. The rings may alternatively be formed or machined to include such members.

In certain embodiments the horizontal rings may comprise guides for the first portion of vertical, rectangular, planar metal plates having slots, where the guides may comprise wedge-shaped cut-outs positioned about the horizontal ring where the horizontal ring and metal plates mesh.

In certain embodiments the insulation material may be selected from the group consisting of aerogel, glass fiber, mineral fiber, cellular glass foam, polyisocyanurate foam, and combinations and composites thereof. In certain embodiments the insulation material may have a metal foil and/or hex wire backing or facing, and in such embodiments, the metal foil may completely or only partially enclose the insulation material.

In certain embodiments the exterior metal jacket of the insulation panel (not to be confused with the aforementioned metal foil backing or facing) may be selected from the group consisting of aluminum sheet, stainless steel sheet, sheets of alloys of zinc and aluminum, and combinations and composites thereof.

Certain embodiments of the insulation panels disclosed herein may include a thermal expansion break pad, as further described herein.

In certain embodiments the plurality of insulation panels may be secured to the insulation support system using a plurality of threaded members.

In certain embodiments each of the tensioned insulation securing cables may be selected from T304 stainless steel, T316 stainless steel, and a solid-solution alloy having a melting point range of 2370 to 2460° F. (1300 to 1350° C.) consisting essentially of (or consisting of) from 28 to 34 (or 29 to 34, or 30 to 34, or 31 to 34, or 32 to 34, or 28 to 33, or 28 to 32, or 28 to 31, or 28 to 30) percent copper, a minimum of 63 percent nickel (or a minimum of 64, or 65, or 66, or 67, or 68, or 69, or 70, or 75 percent nickel), a maximum of 2.0 (or 1.9, or 1.8, or 1.7, or 1.6, or 1.5, or 1.4, or 1.3, or 1.2, or 1.1, or 1.0, or 0.5) percent manganese, a maximum of 2.5 (or 2.4, or 2.3, or 2.2, or 2.1, or 2.0, or 1.5, or 1.0, or 0.5) percent iron, a maximum of 0.3 (or 0.25, or 0.2, or 0.15, or 0.1) percent carbon, a maximum of 0.024 (or 0.023, or 0.022, or 0.021, or 0.020, or 0.019), or 0.018, or 0.017, or 0.016, or 0.015, or 0.010, or 0.005) percent sulfur, and a maximum of 0.5 (or 0.4, or 0.3, or 0.3, or 0.1) percent silicon.

In certain insulated coke drum embodiments the each of the insulation securing cables may be tensioned to at least 450 lb, or at least 455, or at least 460, or at least 465, or at least 470, or at least 475, or at least 480, or at least 490, or at least 500 lb.

Certain insulated coke drum embodiments may comprise a plurality of heat containment shields strategically positioned about the exterior surface of the coke drum to allow a serpentine convection of heated air generally upward about the exterior surface of the coke drum in gaps between the coke drum exterior surface and the insulation panels, each heat containment shield comprising an arcuate, insulated sheet metal upright portion, and a non-insulated sheet metal shank attached to an underside of the horizontal portion of the support ring, for example by threaded members, or welded, or brazed thereto. In certain preferred embodiments one or more (or all) of the heat containment shields may be placed around the entire circumference of the coke drum, attached to respective insulation support rings, for the purpose of preventing the "stack effect" or "chimney effect", in other words preventing the flow of heated air upward by convection. The stack effect tends to lower the temperature of the coke drum, and may be disadvantageous to stable coke drum operation during delayed coking. However, when the coke in the coke drum is being drilled out, it may be advantageous to allow the drum to cool, and therefore one, several, or all of the heat containment shields may be removed, or a portion of individual heat containment shields removed.

Insulation kits are another aspect of the disclosure. As mentioned herein, one kit may comprise (or consist essentially of, or consist of) an insulation support system comprising a series of weldments (preferably vertical, rectangular CS plates, or "clips") adapted to be welded to an exterior surface of a vessel in spaced apart horizontal rows, and a plurality of insulation support rings adapted to be vertically spaced and supported by but not attached to the weldments, each support ring having a diameter greater than the external diameter of the vessel to be insulated; other kits may replace the weldments with a series of brackets securable to the insulation support rings, and to s a plurality of vertical steel bands, the bands in turn secured to a collar near the top of the coke drum. In either case the kit further comprises ii) a plurality of insulation panels adapted to be secured to the support rings, each insulation panel comprising insulation material and an exterior metal jacket, each insulation panel adapted to be positioned between horizontally adjacent insulation panels with single-folded standing seams; and iii) a plurality of tensionable insulation securing cables corresponding in number to the plurality of support rings, the cables adapted to be routed through horizontally aligned eyelets in each standing seam.

Another aspect of the disclosure is a method of insulating a pressure vessel (coke drum, storage tank) comprising (or consisting essentially of, or consisting of):

(a) attaching an insulation support structure to an external surface of the pressure vessel, the insulation support structure configured to allow the pressure vessel to expand and contract without damage to the pressure vessel;

(b) attaching a plurality of insulation panels to the insulation support structure; and (c) securing the plurality of insulation panels to the insulation support structure and to the pressure vessel using a plurality of tensioned insulation securing cables tensioned to a least 450 lb wherein each of the tensioned insulation securing cables is selected for the group consisting of stainless steel and a solid-solution alloy having a melting point range of 2370 to 2460° F. (1300 to 1350° C.) consisting essentially of (or consisting of) from 28 to 34 (or 29 to 34, or 30 to 34, or 31 to 34, or 32 to 34, or 28 to 33, or 28 to 32, or 28 to 31, or 28 to 30) percent copper, a minimum of 63 percent nickel (or a minimum of 64, or 65, or 66, or 67, or 68, or 69, or 70, or 75 percent nickel), a maximum of 2.0 (or 1.9, or 1.8, or 1.7, or 1.6, or 1.5, or 1.4, or 1.3, or 1.2, or 1.1, or 1.0, or 0.5) percent manganese, a maximum of 2.5 (or 2.4, or 2.3, or 2.2, or 2.1, or 2.0, or 1.5, or 1.0, or 0.5) percent iron, a maximum of 0.3 (or 0.25, or 0.2, or 0.15, or 0.1) percent carbon, a maximum of 0.024 (or 0.023, or 0.022, or 0.021, or 0.020, or 0.019), or 0.018, or 0.017, or 0.016, or 0.015, or 0.010, or 0.005) percent sulfur, and a maximum of 0.5 (or 0.4, or 0.3, or 0.3, or 0.1) percent silicon.

In certain embodiments, step (b) may comprise forming a plurality of single-folded standing seams between adjacent insulation panels, and forming an eyelet through-hole in a lower section of each single-folded standing seam, and step (c) may comprise passing one of the insulation securing cables through a plurality of the eyelets on a plurality of horizontal levels, and tensioning the cables to a tension of at least 450 lb, or at least 455, or at least 460, or at least 465, or at least 470, or at least 475, or at least 480, or at least 490, or at least 500 lb.

The primary features of the systems, kits, combinations, and methods of the present disclosure will now be described with reference to the drawing figures, after which some of the construction and operational details, some of which are optional, will be further explained. The same reference numerals are used throughout to denote the same items in the figures.

FIG. 1 is a schematic side elevation view, partly in cross-section, of one embodiment 100 of a non-insulated coke drum, prior to installation of insulation panels, and FIGS. 2-5 illustrate one embodiment 200 of an insulation support system (FIG. 5 with insulation panel installed), illustrating certain features of insulation support systems in accordance with the present disclosure. Referring first to FIG. 1, the non-insulated coke drum includes a cylindrical body 2 (sometimes referred to as the "straight section" as it has a straight side 3), comprising a plurality of coke drum cylindrical sections welded together at weld seams 4; a coke drum top head 6 welded to the straight section 2 at weld seam 8; and a bottom conical section 22 welded to straight section 2 at a weld seam 20, conical section 22 having a conical side 23 making a cone angle "a" with weld seam 20 ranging from about 40 to about 60 degrees. Coke drum body 2 has a diameter D ranging from about 4 to about 9 meters (m), and a height H ranging from about 20 to 30 m.

Still referring to FIG. 1, non-insulated coke drum embodiment 100 includes a vapor outlet nozzle 10, a top blind flange closure 12, and a pressure relief conduit leading to a pressure relief valve (not illustrated). More than one pressure relief conduit and pressure relief valve may be provided. Top blind flange has a diameter $d_1$, and vapor outlet nozzle 10 has a diameter of dz. Bottom blind flange connection 24 has a diameter of $d_3$, and would include a flange connection to a 15 to 30 cm diameter coke drum inlet nozzle, not illustrated. The values of D, H, $d_1$, $d_2$, $d_3$, and other dimensions and angles referred to herein are summarized in Table 1. A coke drum skirt 26 is provided, as well as drilling derrick connections 28, 30 allowing connection to a drilling derrick, not illustrated, as well as a platform 32, a portion of which is illustrated in FIG. 1.

Figure 4:
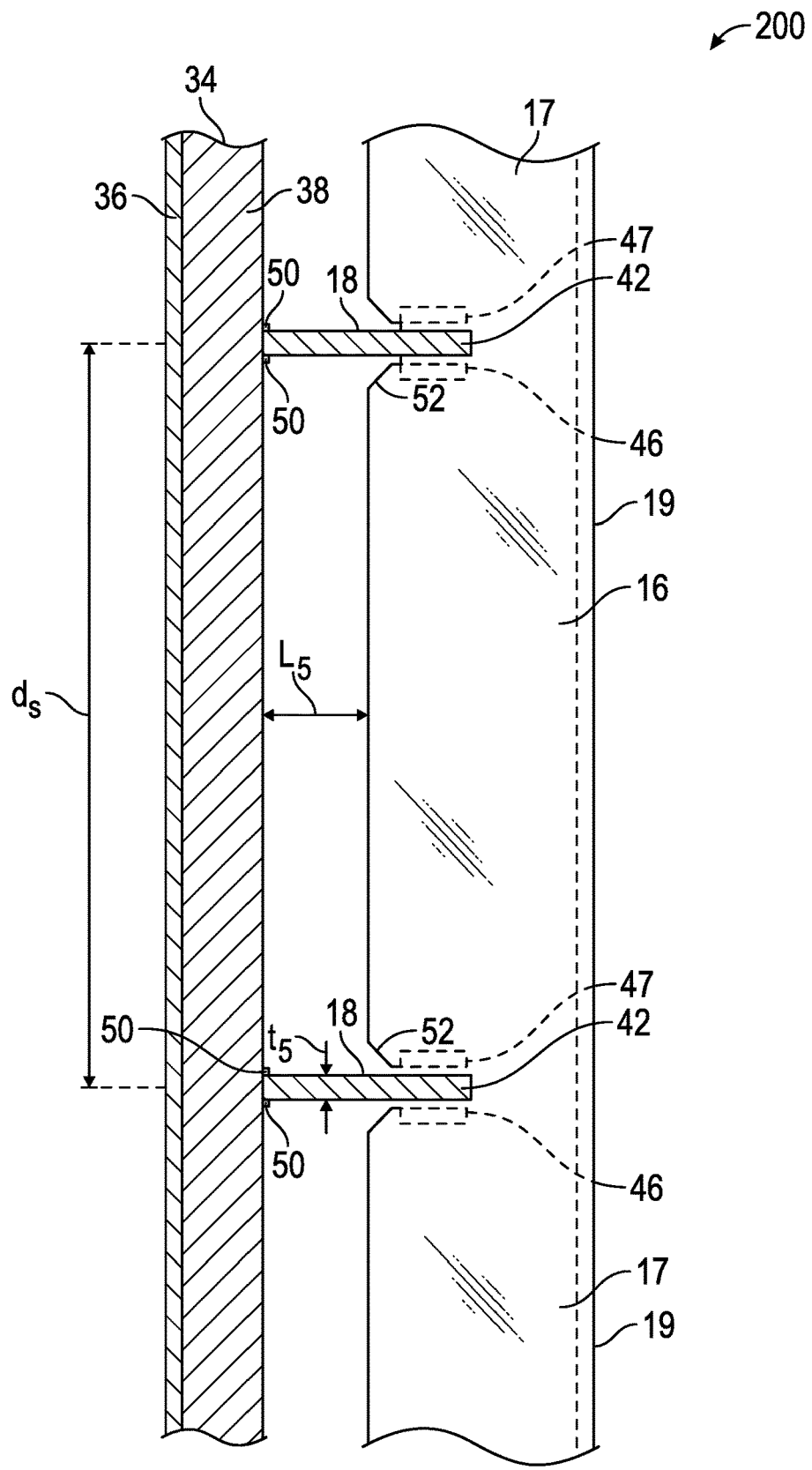
FIG. 4 is a plan view, partially in cross-section, and partially in phantom, of an insulation support ring and two insulation support members of the embodiment illustrated schematically in FIG. 3.
Figure 5:
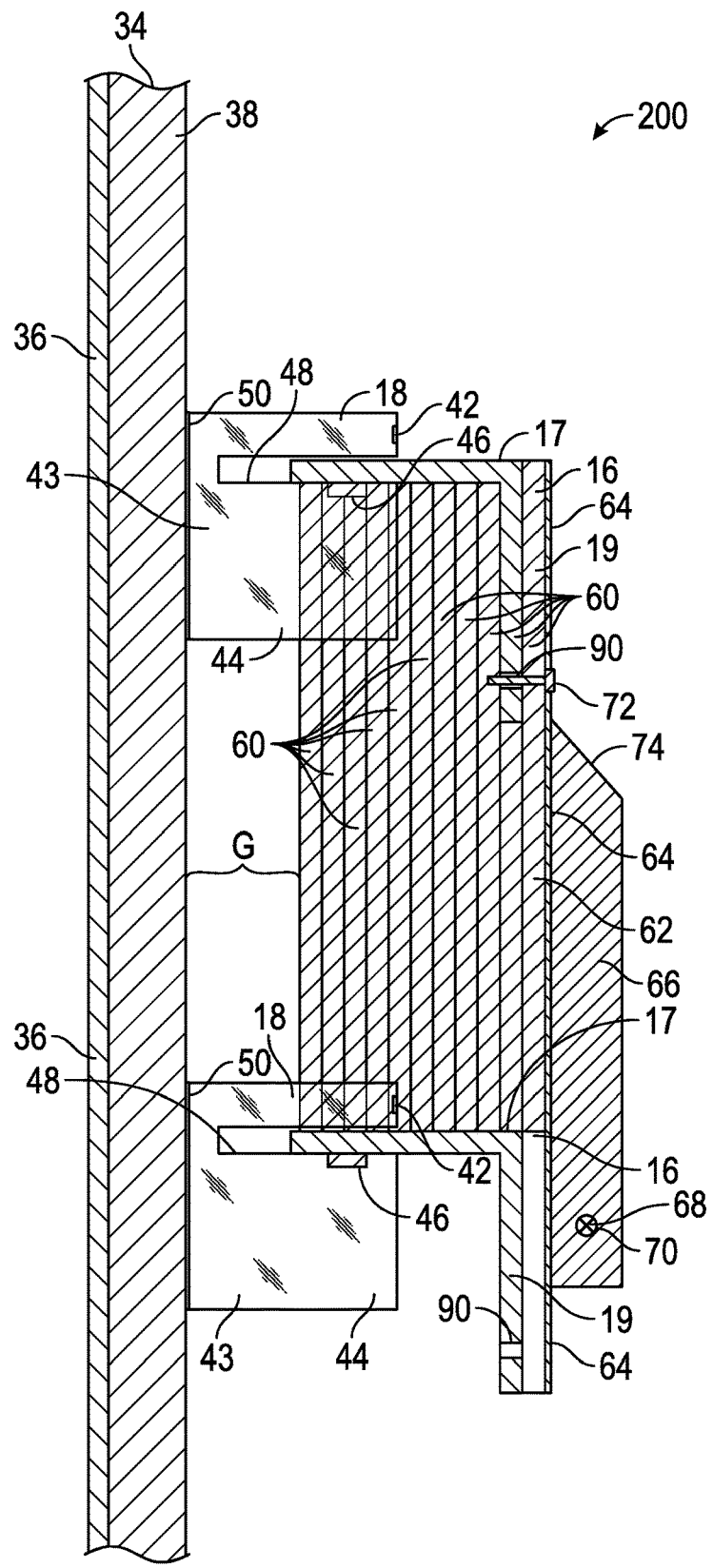
FIG. 5 is a side elevation view, partially in cross-section, of an insulation panel of the disclosure installed on a coke drum in accordance with one embodiment of the disclosure, using insulation support members illustrated schematically in FIGS. 3 and 4.
Figure 6:
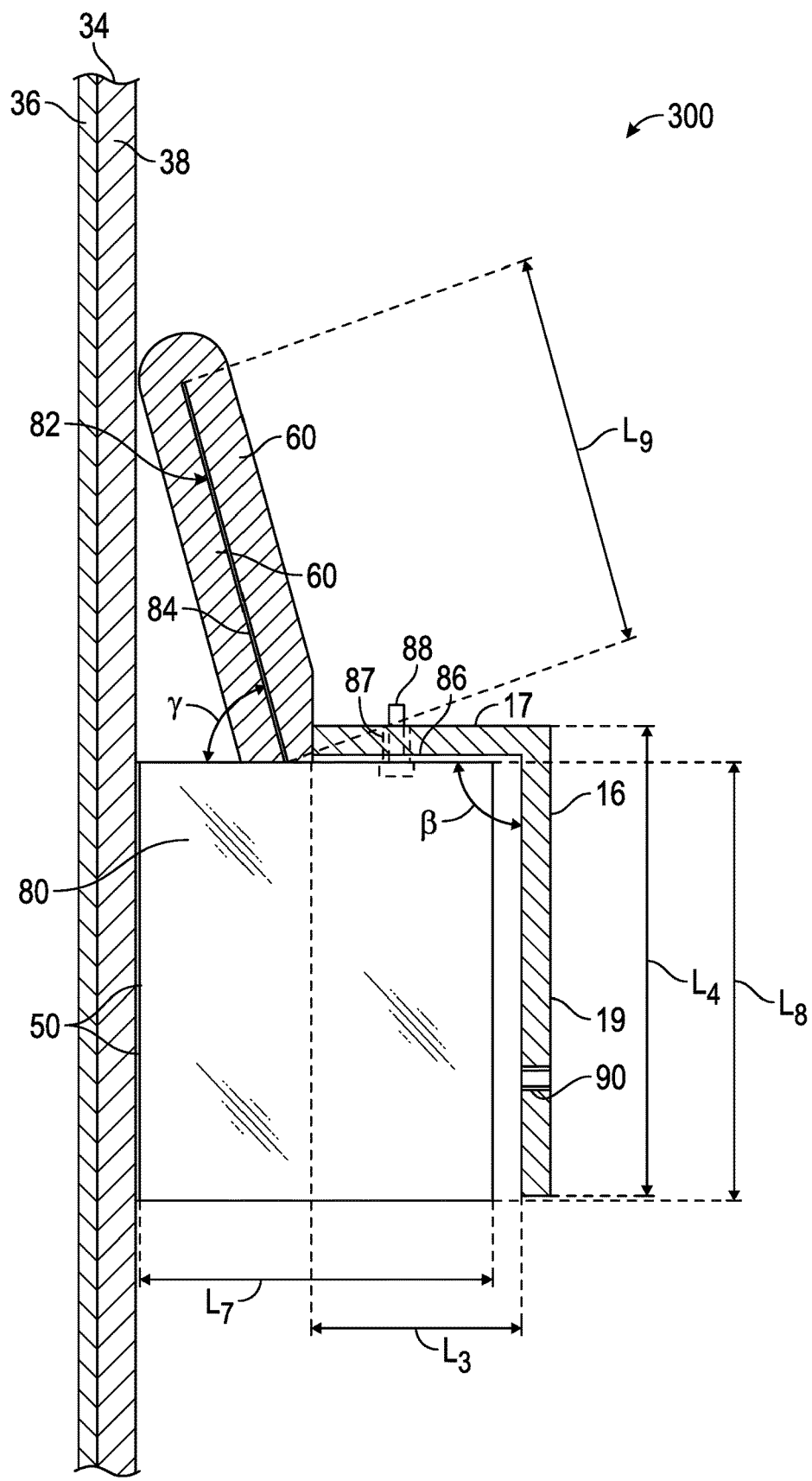
FIG. 6 is a side elevation view, partially in cross-section, of another insulation support member and an insulation support ring embodiment in accordance with the present disclosure installed on a coke drum straight side.
Figure 7:
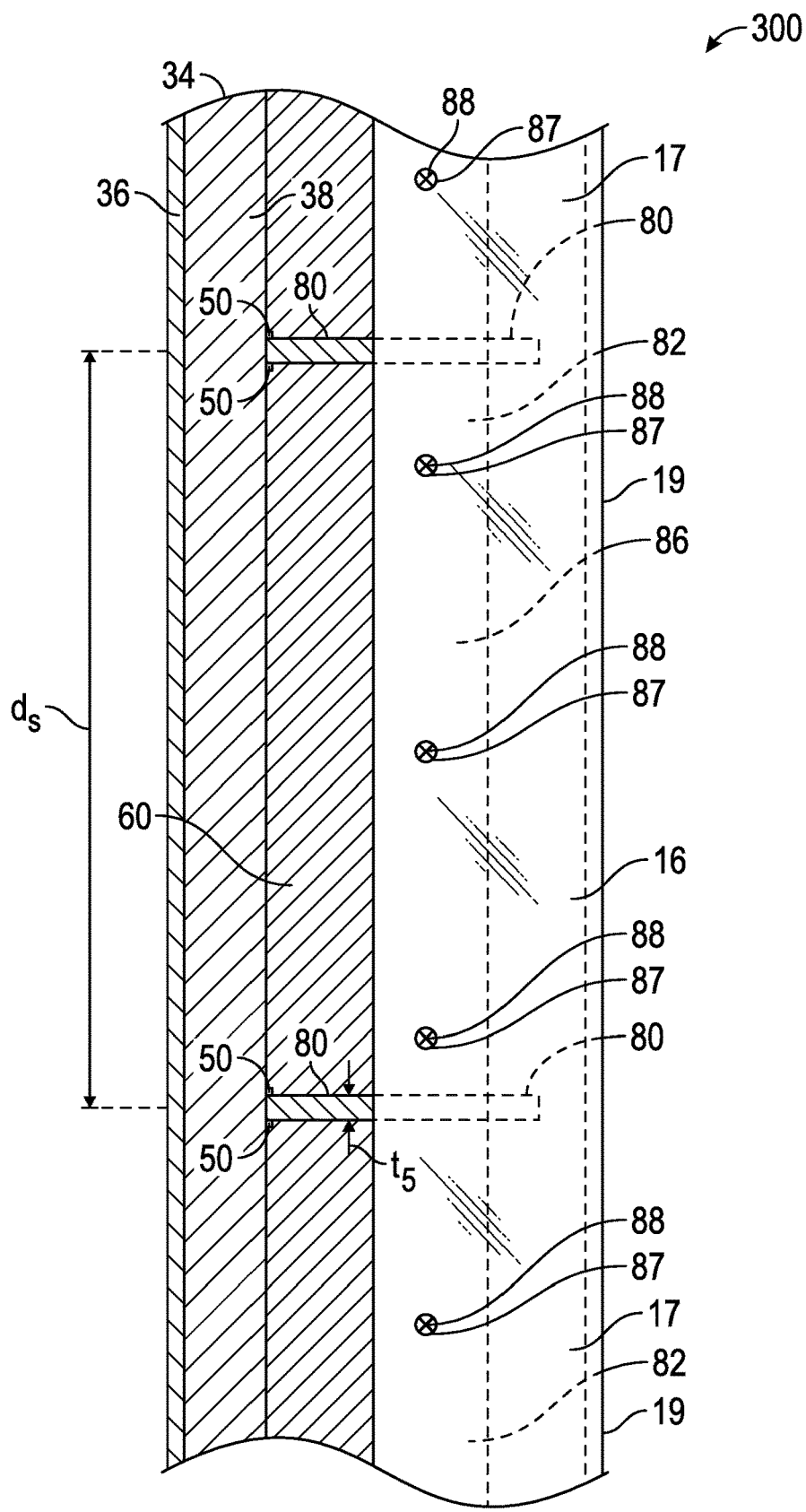
FIG. 7 is a plan view, partially in cross-section, and partially in phantom, of an insulation support ring, two insulation support members, and a heat containment shield in accordance with the embodiment illustrated schematically in FIG. 6.
Figure 8:
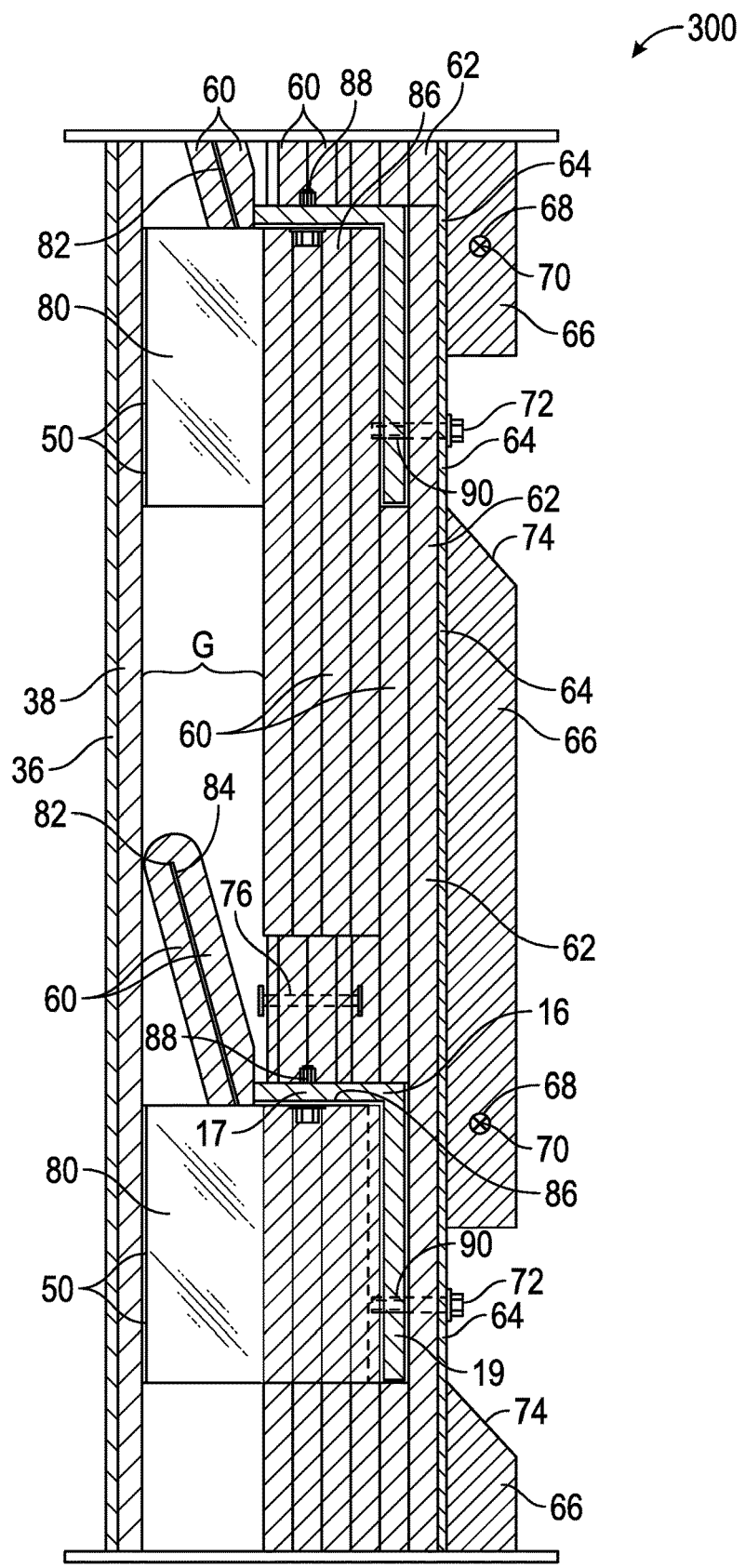
FIG. 8 is a side elevation view, partially in cross-section, of an insulation panel of the disclosure installed on a coke drum in accordance with a second embodiment of the disclosure, using insulation support members and heat containment shield as illustrated schematically in FIGS. 6 and 7.

Continuing to refer to FIG. 1, as well as FIGS. 2-5, embodiment 100 includes a plurality of insulation support rings 16 and insulation support members 18 and/or 80, the latter as further described herein with reference to FIGS. 6-8. Non-insulated and insulated coke drums may include only insulation support members 18, only support members 80, or some of each. For clarity, insulation support members 18/80 are only illustrated on the periphery and in one horizontal row, and only one insulation support ring 16 is illustrated schematically in FIG. 1, it being understood that embodiment 100 has 14 horizontal rows of support members 18 and/or 80 attached to coke drum straight side 3, with a support ring 16 supported on each row of insulation support members.

Figure 2:
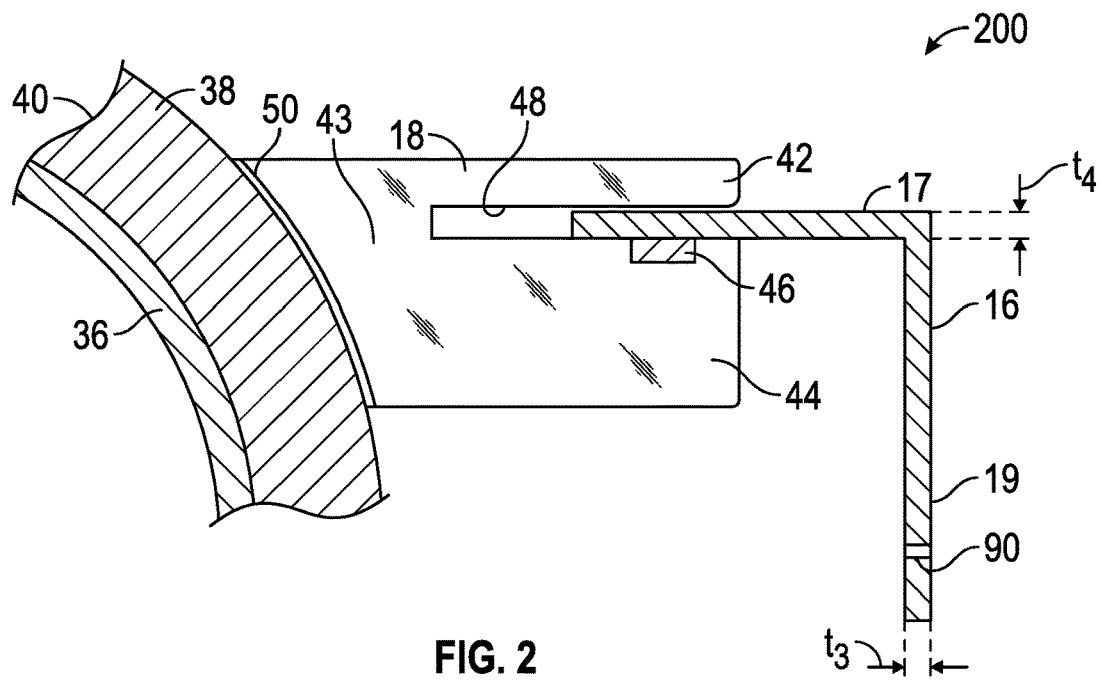
FIG. 2 is a side elevation view, partially in cross-section, of one insulation support member and an insulation support ring embodiment within the present disclosure installed on a coke drum head.
Figure 3:
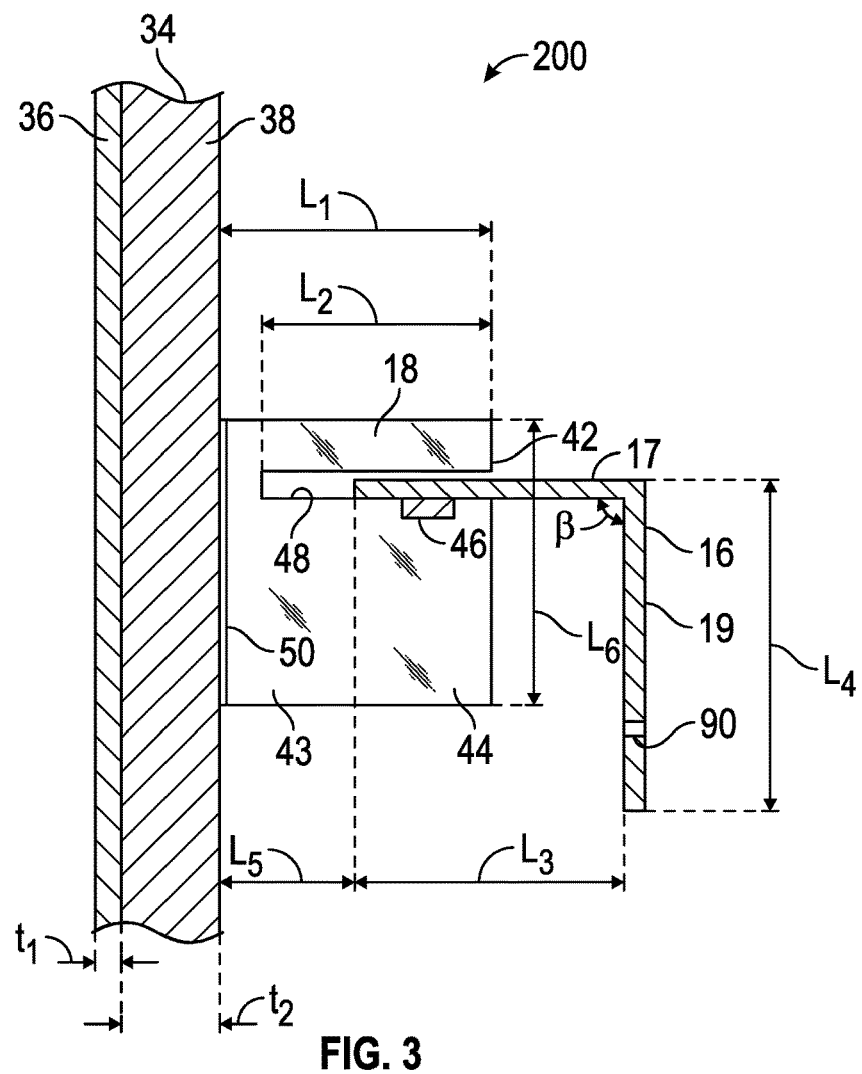
FIG. 3 is a side elevation view, partially in cross-section, of an insulation support member and an insulation support ring embodiment similar to the embodiment illustrated schematically in FIG. 2, installed on a coke drum straight side.

FIG. 2 is a side elevation view, partially in cross-section, of one insulation support member 18 and an insulation support ring 16 embodiment 200 within the present disclosure installed on coke drum top head 6, while FIG. 3 is a side elevation view, partially in cross-section, of an insulation support member 18 and an insulation support ring 16 embodiment 200 similar to embodiment 200 illustrated schematically in FIG. 2, installed on coke drum straight side 3. Referring to FIG. 2, coke drum top head wall 40 includes a stainless steel cladding inner layer 36 and a carbon steel shell 38, having thicknesses $t_1$ and $t_2$, respectively, similar to (more or less) or identical to those illustrated schematically in FIG. 3 for a coke drum straight side. The operating pressure of coke drums currently ranges from 1 to about 6 bars, typically around 2 to 3 bars. Insulation support member 18 is T-joint welded at 50 to carbon steel shell 38, it being understood that another weld 50, not illustrated, would exist on the back side of insulation support member 18. As illustrated schematically in FIGS. 2-5, insulation support member 18 includes an upper planar member 42 and a lower planar member 44, members 42 and 44 having a common base 43 that is T-joint welded to shell 38 in mating arcuate fashion. As illustrated in FIGS. 2, 3, and 5, upper and lower planar members 42, 44 are configured to form between them a slot 48 extending away from coke drum top head wall 40 and coke drum side wall 34.

As further illustrated schematically in FIGS. 2-5, an insulation support ring (ISR) 16 is depicted as having a horizontal ring 17 formed with or welded to a vertical ring 19. Vertical ring 19 has a thickness of $t_3$, and horizontal ring has a thickness of $t_4$ (FIG. 2), and several more dimensions of insulation support member 18 and ISR 16 are indicated in FIG. 3, and summarized in Table 1, including an angle "β" made by horizontal ring 17 and vertical ring 19. As may readily be seen, as coke drum wall 34 and/or top head wall 40 expand and contract due to thermal conditions therein, the ISRs are allowed to "float" and move back and forth in slots 48. Another feature of embodiment 200 is the provision of anti-rotation members 46, 47, formed with or welded or brazed to horizontal ring 17. In their simplest form, anti-rotation members 46, 47 are small steel plate-shaped members as illustrated weld to an underside of horizontal ring 17. Alternatively, anti-rotation members 46, 47 may be replaced by (or augmented with) members welded to vertical ring 19. Anti-rotation members 46, 47 may be provided to reduce or prevent rotation of ISR 16 about an axis perpendicular to the longitudinal axis L of the coke drum, and are optional and may not be required in every embodiment.

FIG. 4 is a top plan view, partially in cross-section, and partially in phantom, of an insulation support ring and two insulation support members of the embodiment illustrated schematically in FIG. 3 welded to coke drum wall 34. It will be understood that the arcuate curvature of the coke drum and ISR 16 are not detailed in FIG. 4. A distance $d_s$ is defined as the spacing distance (center-to-center) between respective neighboring pairs of insulation support members 18. Other dimensions are illustrated, for example thickness of insulation support members 18 is indicated as $t_5$, and a distance $L_5$ between an inside edge of horizontal ring 17 and the exterior surface of coke drum wall 34. These are summarized in Table 1. Another feature is the (optional) provision of guides 52, essentially wedge-shaped cut-outs in horizontal ring 17, which assist both during installation and during thermal movement (when the ISR horizontal ring 17 is moving in slot 48).

FIG. 5 is a side elevation view, partially in cross-section, of an insulation panel of the disclosure installed on a coke drum employing the insulation support system 200 illustrated in FIGS. 2-4. Insulation layers 60 of various material and thickness are illustrated, with an innermost layer separated from coke drum wall 34 by a gap "G", and an outermost insulation layer 62 having a sheet metal jacket 64 and a single-folded standing seam 66. Certain insulation panels may include a metal poultry netting (not illustrated) as an innermost material, especially in insulation panels used for insulating coke drum top heads. Single-folded standing seams are similar to rolled standing seams such as disclosed for example in assignee's U.S. Pat. No. 4,534,490, except that there is no rolling over of the top. One novel and unique feature is the provision of one or more eyelet through holes 68 in each standing seam 66 that allow snaking through them of insulation support cables 70, made for example of corrosion-resistant, flexible alloys such as T304 stainless steel (or analogs thereof, such as UNS 530400; AMS 5501, 5513, 5560, 5565; ASME SA182, SA194 (8), SA213, SA240; ASTM A167, A182, A193, A194) or T316 stainless steel (or analogs thereof, such as UNS S31600, SS316, 316SS, AISI 316, DIN 1.4401, DIN 1.4408, DIN X5CrNiMo17122, TGL 39672 X5CrNiMo1911, TGL 7143X5CrNiMo1811, ISO 2604-1 F62, ISO 2604-2 TS60, ISO 2604-2 TS61, ISO 2604-4 P60, ISO 2604-4 P61, ISO 4954 X5CrNiMo17122E, ISO 683/13 20, ISO 683/13 20a, ISO 6931 X5CrNiMo17122, JIS SUS 316 stainless steel, or the alloy known under the trade designation MONEL® nickel-copper alloy 400. The composition and some physical properties of MONEL® nickel-copper alloy 400 are summarized in Tables 2 and 3 (from Publication Number SMC-053 Copyright © Special Metals Corporation, 2005), and some commercially available cables are listed in Table 4. The composition and some physical properties of T304 and T316 stainless steels are summarized in Tables 5 and 6. MONEL® nickel-copper alloy 400 (equivalent to UNS N04400/W.Nr. 2.4360 and 2.4361) is a solid-solution alloy that can be hardened only by cold working. It has high strength and toughness over a wide temperature range and excellent resistance to many corrosive environments.

Single-folded standing seams 66 may include a rain shield as discussed herein to prevent moisture ingress. In certain embodiments coke drum top heads and conical lower sections may employ single-folded standing seams where moisture intrusion may be a severe problem, whereas the standing seams in the coke drum straight section may be single-folded (non-folded), as long as they include a rain shield. A threaded member 72, such as a T-5 screw, secures the insulation panel at an upper portion of the insulation panel to vertical ring 19 of ISR 16. The screw 72 is threaded into a mating threaded passage 90, and washer combination fastener. A lower portion of the insulation panel is secured to the insulation support system by tensioning cable 70, the ends of cable 70 being connected in known fashion by a turnbuckle or other cable end fastener system (known in the art and therefore not illustrated). Cables 70 may be tensioned to a minimum of 450 lb (or higher as described herein) for coke drum insulation. Since the cables are located outside of the insulation, tension may be tested before installation (such as during transport) and after installation, and even during operation of the underlying coke drum, pressure vessel or storage vessel. Suitable cable tension testers are available commercially, for example those available from Tensitron Inc., Longmont, Colo., (USA).

FIG. 6 is a side elevation view, partially in cross-section, of another insulation support system 300, including an insulation support member 80 and an insulation support ring (ISR) 16 in accordance with the present disclosure installed on a coke drum straight sidewall 34. The ISR 16 illustrated schematically in FIGS. 6-8 differs from that depicted in FIGS. 2-5 only by lacking guides 52 and optional anti-rotation members 46, 47. Embodiment 300 includes a sheet metal heat containment shield plate 82 having an upright portion 84 of length $L_9$ surrounded by insulation 60 and angled to horizontal at an angle "γ" (heat containment shield angle) having a value within the ranges given in Table 1. Heat containment shield plate 82 includes a shank portion 86 connected to an underside of horizontal ring 17 by one or more threaded members 88 extending through mating threaded passages 87. Ranges for dimensions $L_7$ and $L_8$ are also provided in Table 1.

FIG. 7 is a plan view, partially in cross-section, and partially in phantom, of an insulation support ring 16, two insulation support members 80, and an insulated heat containment shield plate 60, 84 in accordance with embodiment 300 illustrated schematically in FIG. 6. Insulated heat containment shield 60, 84 extends the full circumference of the coke drum in this embodiment, and embodiments where all heat containment shields extend the entire circumference of the coke drum are preferred, however it is not necessarily so for all embodiments.

FIG. 8 is a side elevation view, partially in cross-section, of an insulation panel of the disclosure installed on a coke drum in accordance with embodiment 300 of the disclosure, using insulation support members 80 and insulated heat containment shield as illustrated schematically in FIGS. 6 and 7. Insulation layers 60 are illustrated, which may be the same or different insulation material and thickness from layer to layer. In all respects the outermost insulation layer 62, metal jacket 64, and standing seam 66 are the same as in embodiment 200. Optionally, certain installations may include one or more additional securing pins 76, as illustrated schematically in FIG. 8.

Figure 9:
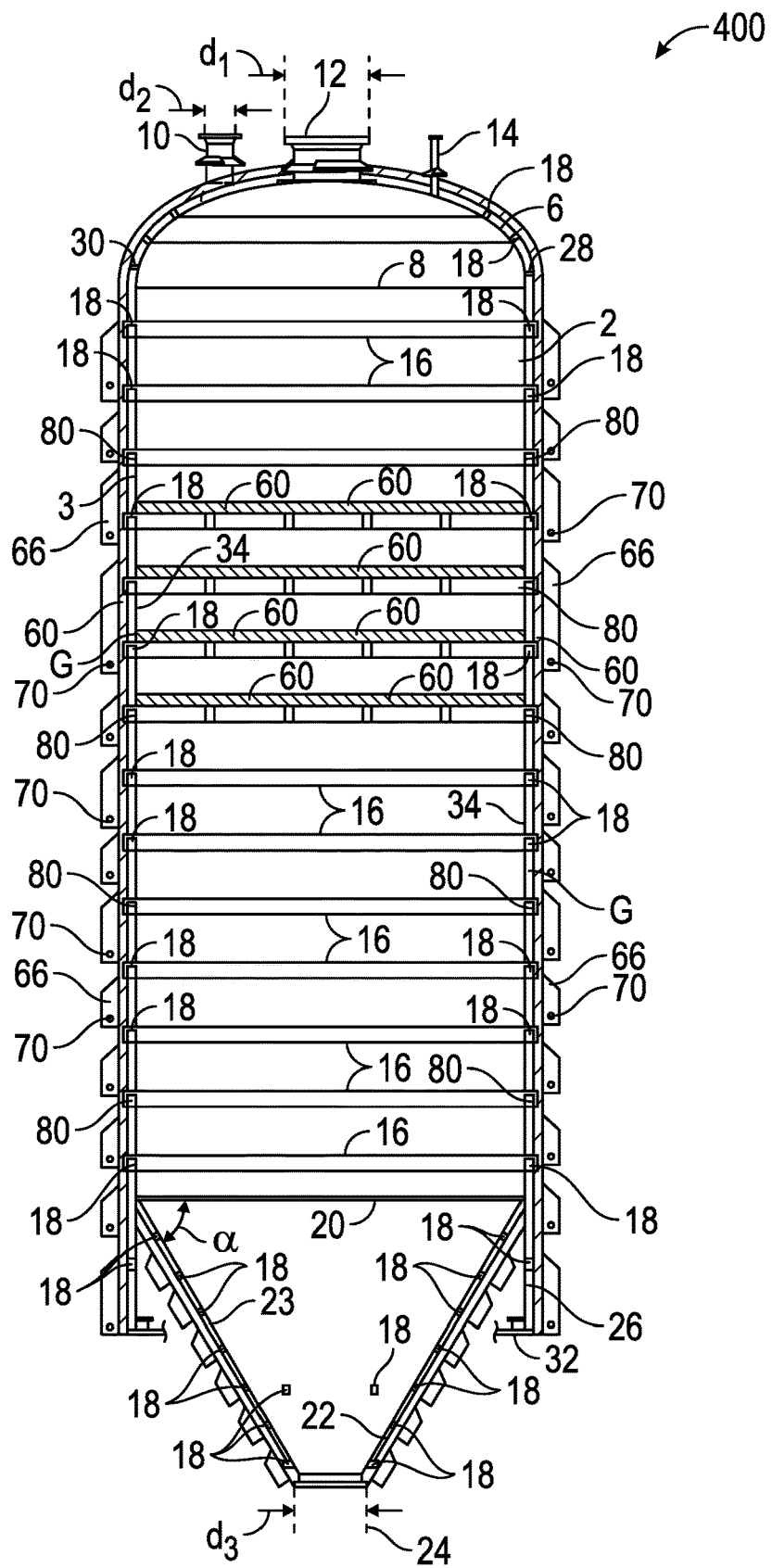
FIG. 9 is a schematic side elevation view, partly in cross-section, of one embodiment of an insulated coke drum, after installation of insulation panels, illustrating certain features of one embodiment of an insulated coke drum in accordance with the present disclosure.

FIG. 9 is a schematic side elevation view, partly in cross-section, of one embodiment 400 of an insulated coke drum, after installation of insulation panels, illustrating certain features of one embodiment of an insulated coke drum in accordance with the present disclosure. Insulated coke drum embodiment 400 includes both types of insulation support members 18 and 80 in alternating arrangement, but this is optional, as any one embodiment may have all of one type or the other. Furthermore, the insulation support system may be either one of the types of insulation support systems described herein (using weldment supports, or cage-type). The total thickness of all insulation layers 60 depends on the type of insulation materials used, but may range from 8 to 12 inches. The coke level in the drum is usually determined with one or more nuclear backscatter devices mounted on the outside of the drum (not illustrated).

Figure 10:
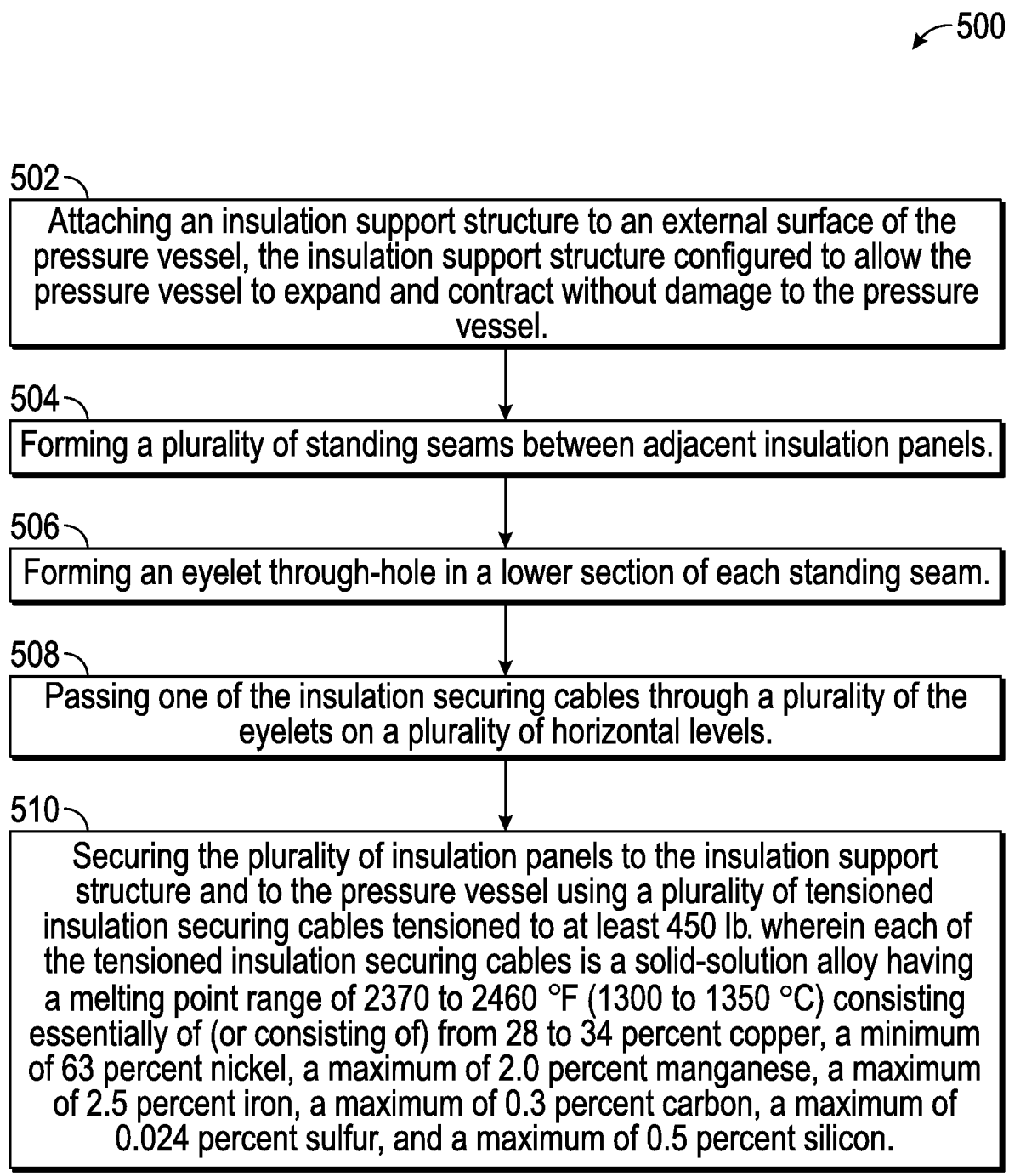
FIG. 10 is a logic diagram of a method of insulating a non-insulated pressure vessel or storage tank in accordance with the present disclosure.

FIG. 10 is a logic diagram of one method of insulating a non-insulated pressure vessel or storage tank in accordance with the present disclosure. Method embodiment 500 includes attaching an insulation support structure to an external surface of the pressure vessel, the insulation support structure configured to allow the pressure vessel to expand and contract without damage to the pressure vessel (Box 502). Method embodiment 500 further includes forming a plurality of single-folded standing seams between adjacent insulation panels (Box 504), and forming an eyelet through-hole in a lower section of each single-folded standing seam (Box 506). Method embodiment 500 further includes passing one of the insulation securing cables through a plurality of the eyelets on a plurality of horizontal levels. Method embodiment 500 further includes securing the plurality of insulation panels to the insulation support structure and to the pressure vessel using a plurality of tensioned insulation securing cables tensioned to a least 450 lb wherein each of the tensioned insulation securing cables is selected from stainless steel and a solid-solution alloy having a melting point range of 2370 to 2460° F. (1300 to 1350° C.) consisting essentially of (or consisting of) from 28 to 34 percent copper, a minimum of 63 percent nickel, a maximum of 2.0 percent manganese, a maximum of 2.5 percent iron, a maximum of 0.3 percent carbon, a maximum of 0.024 percent sulfur, and a maximum of 0.5 percent silicon. Certain method embodiments may include installing one or more weather shields at the top of one or more, or all seams, and may further include installing one or more spring-loaded handles to one or more of the insulation panels.

Figure 11:
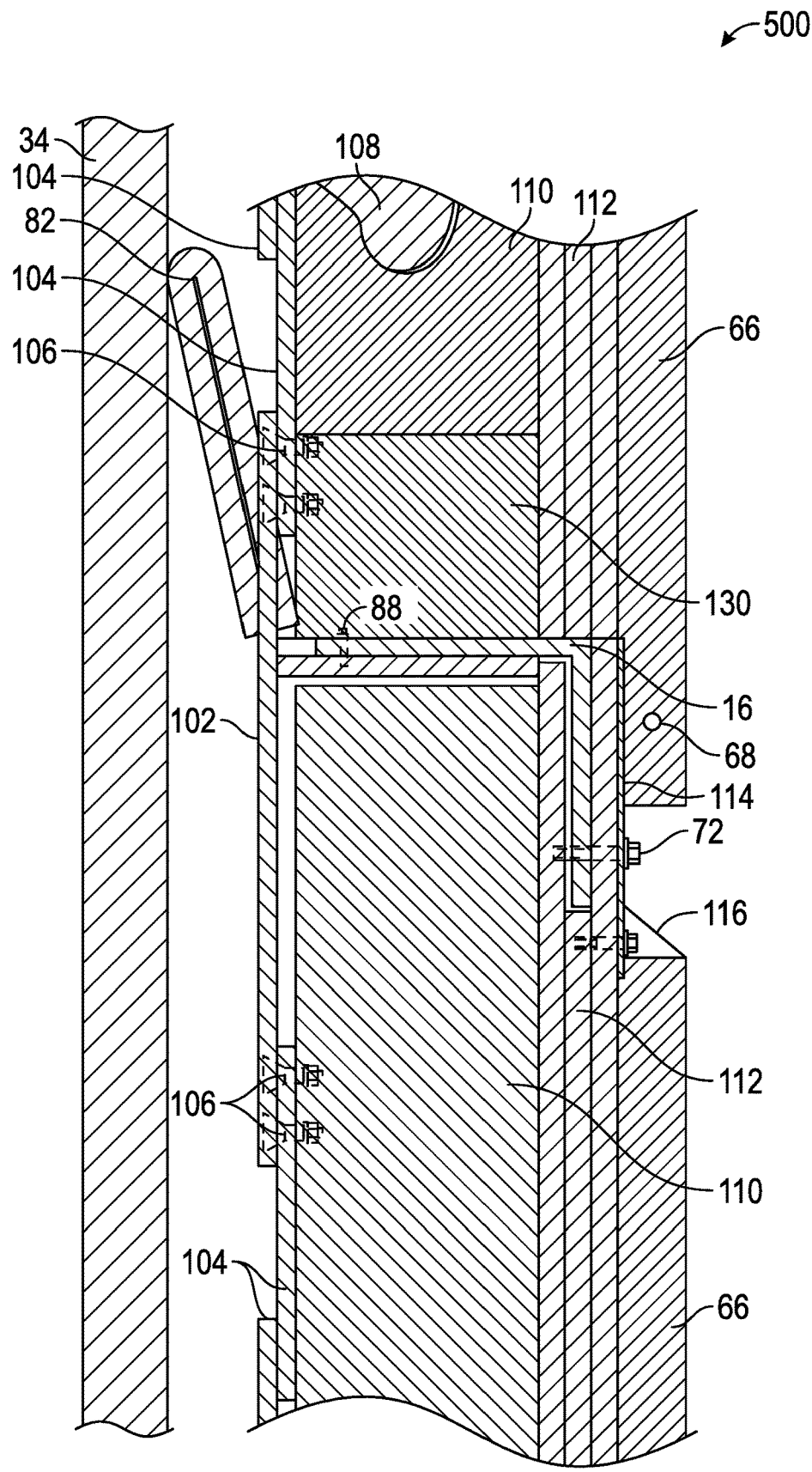
FIG. 11 is a side elevation view, partially in cross-section, of insulation panels of the disclosure installed on a coke drum in accordance with a third embodiment of the disclosure, using a cage insulation panel support system and heat containment shield.

Referring now to FIG. 11, FIG. 11 is a side elevation view, partially in cross-section, of insulation panels of the disclosure installed on a coke drum in accordance with a third embodiment of the disclosure, embodiment 500, using a cage insulation panel support system and heat containment shield. A bracket 102, sometimes referred to herein as a "T-bracket", although its shape and size may vary, is secured via bolts 106 to vertical steel bands 104. The width and shape of the T-bracket depends on multiple factors (size of the insulation support ring, clearance needed, vessel protrusions, and like considerations). Some may be angled at angles other than 90 degrees, and some may be squared. Steel bands 104 may be attached to each other via welding or threaded connectors, not illustrated. Steel bands 104 and insulation support rings 16 form the essential components of a cage support system. Other features of embodiment 500 include the provision of metal foil-enclosed mineral wool insulation, as depicted at 108 and 110; aerogel insulation panels 112; and a weather shield 114 backer plate and nose plate 116. The metal of the metal foil-enclosed insulation may be T-304 stainless steel foil, of thickness of about 0.002 inch, and may optionally include T-304 stainless steel hex wire for support. The mineral wool insulation may be, for example, 3.5-inch thick 8 lb. mineral wool batt. The weather shield backer and nose plates are preferably made of a corrosion-resistant metal, for example T 304 stainless steel, or other steel or more exotic alloy. Also depicted schematically in cross-section is a thermal expansion break pad 130, which may in certain embodiments extend some or all of the entire circumference of the coke drum or other vessel being insulated, and helps break thermal contact that otherwise would naturally exist between the T-bracket and metal foil enclosed insulation 108, 110. Thermal expansion break pads may comprise ultra high density, rigid, closed cell polyurethane (PU) insulation material such as that known under the trade designation ARATHERM™ TIM (thermal insulation material) Grade 500, available from Armadillo Nev., New Bedford, Mass. (U.S.A.).

Figure 12:
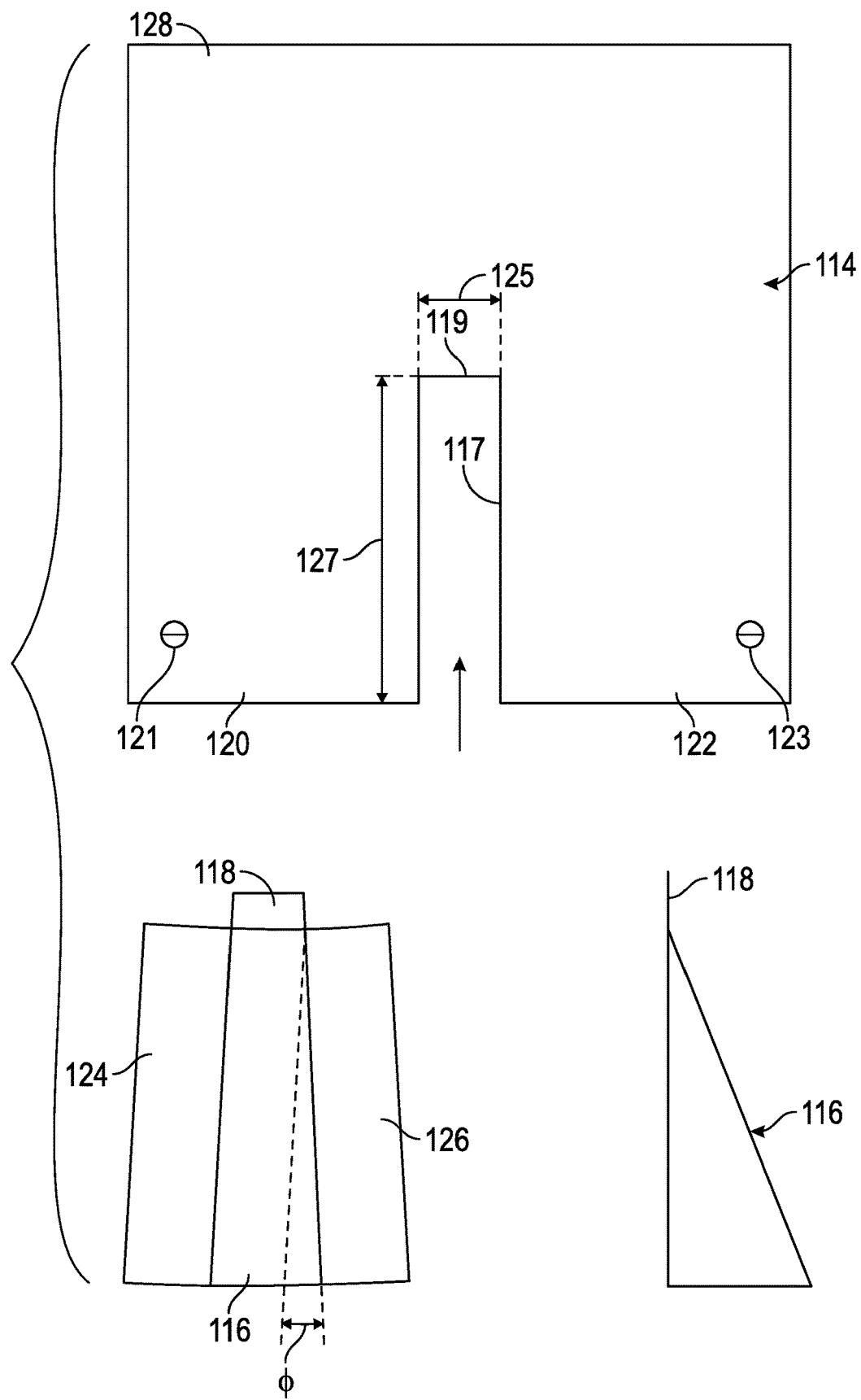
FIGS. 12-14 illustrate schematically weather shield and insulation panel handle features in accordance with the present disclosure.
Figure 13:
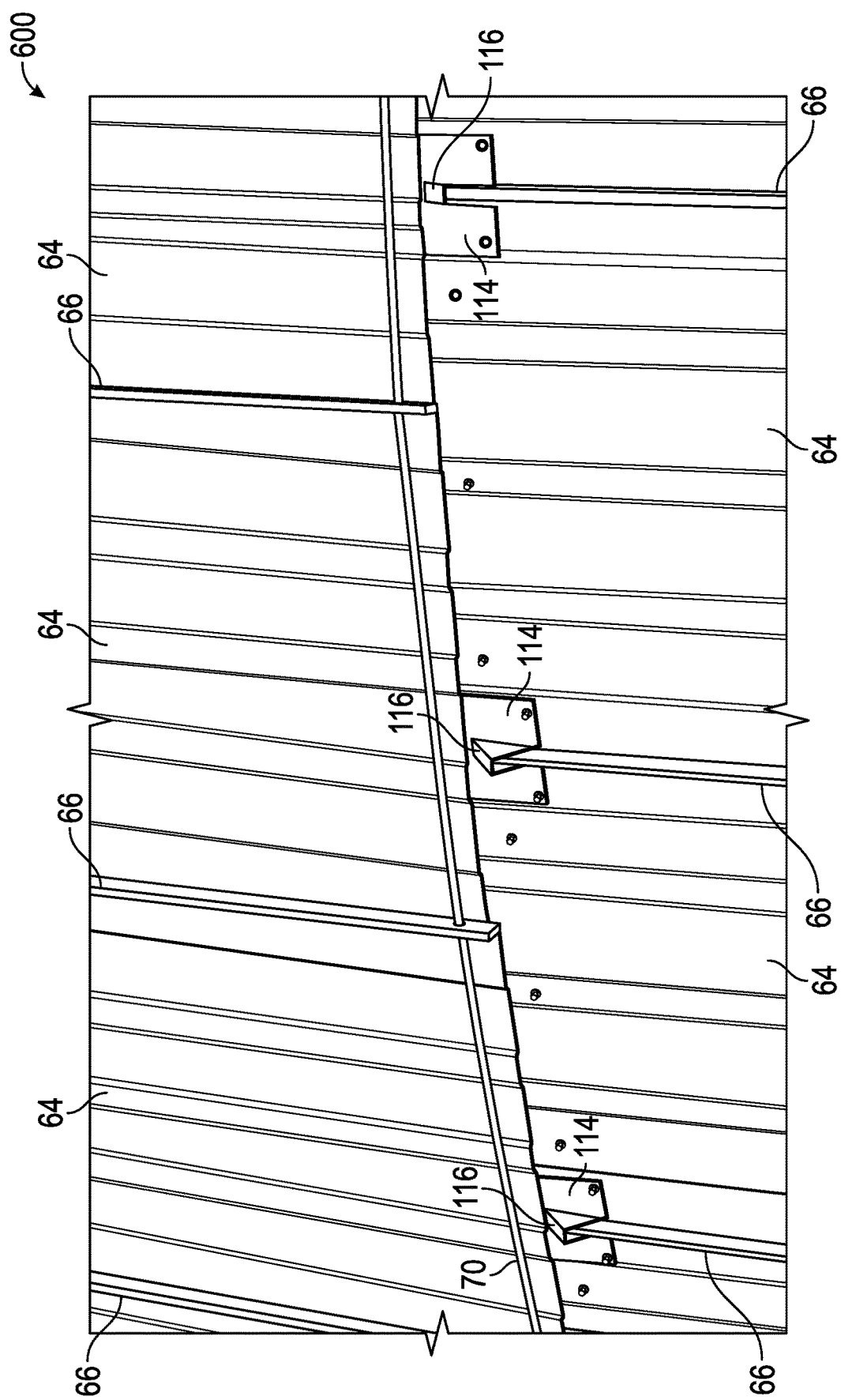
Figure 14:
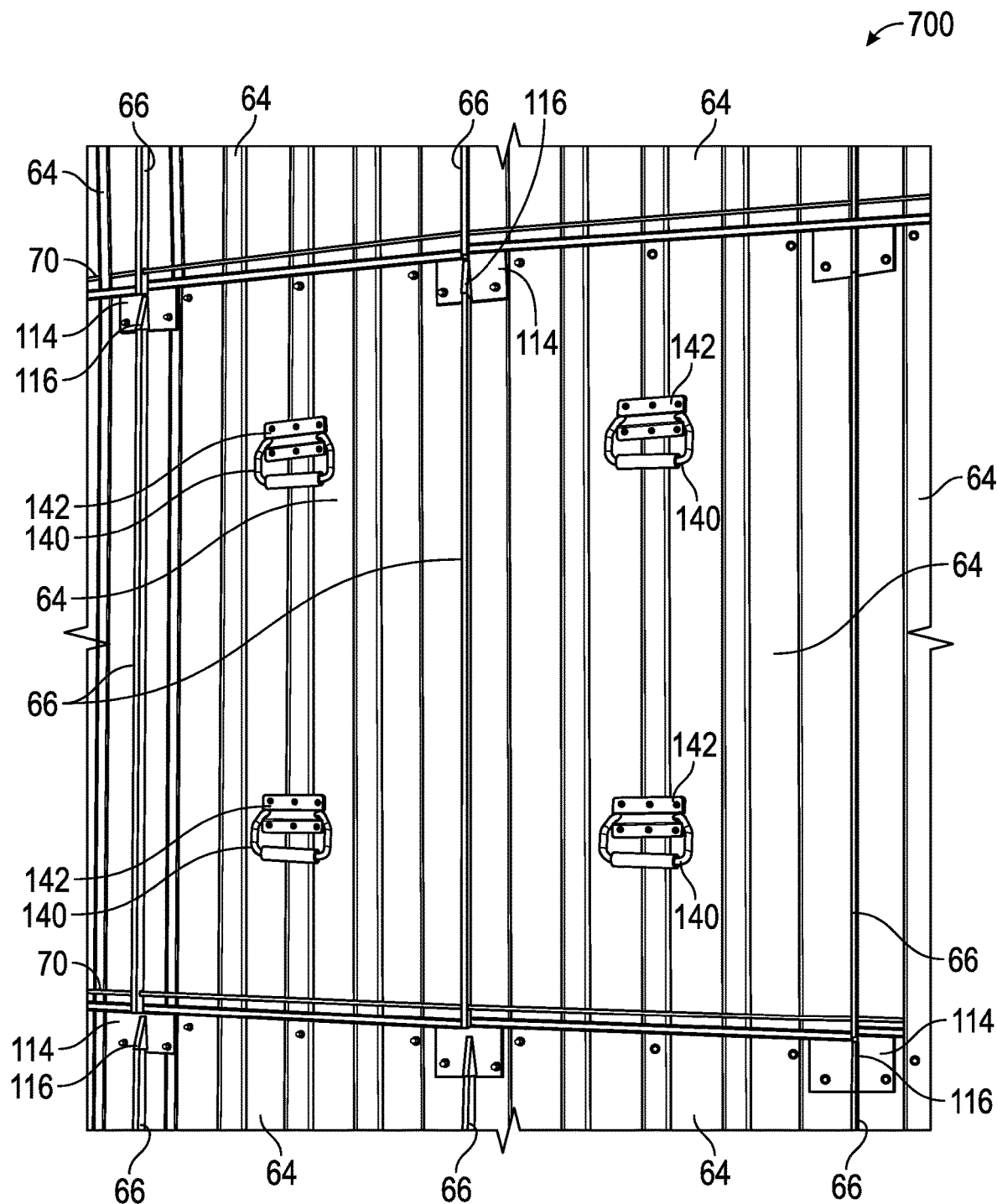

FIGS. 12-14 illustrate schematically in more detail the weather shield and insulation panel handle features in accordance with the present disclosure. As noted with reference to FIG. 12, the weather shield includes a backer plate 114 having a slot 117 formed or cut therein. Slot 117 has an upper terminus 119, a width 125, and a length 127. Backer plate 114 further includes a left-side extension 120 having a through hole 121 therein for a threaded fitting, a right-side extension 120 having a through hole 123 therein for another threaded fitting, and a top region 128. Weather shield nose plate 116 includes a nose extension 118 that is configured to slide underneath backer plate 114, at the slot terminus 119. Nose plate 116 further includes a left-side wing 124 and a right-side wing 126; wings 124 and 126 are configured to slide underneath corresponding left and right side extensions 120 and 122 of backer plate 114. The "nose" of nose plate 114 is configured slightly larger near its bottom than its top, as indicted by angle $\phi$, which may range from about 1 to about 15 degrees, enough to provide a spring-feature to the nose so that it fits snuggly into slot 117, and protrudes out slightly in use, as may be seen in FIGS. 13 and 14.

FIGS. 13 and 14 illustrate in detailed perspective views two embodiments 600 and 700 of installed insulation systems on a coke drum, illustrating how the top region 128 of the weather shield is slid underneath the next upper insulation panel metal jacket 64 and secured therein by cable 70. Embodiments 600 and 700 are similar, except that in embodiment 600 the respective insulation panel seams are offset, while in embodiment 700 they are in-line with each other in the vertical direction. Embodiment 700 of FIG. 14 also illustrates four spring-loaded handles 140 secured to respective outer metal jackets 64 by connector plates 142. Although embodiment 700 indicates use of two spring-loaded handles arranged vertically on each insulation panel, there may be more or fewer such handles, and not all need be spring-loaded. Spring-loaded handles are known, although their use in combination with insulation panels is not. Suitable spring-loaded handles are available from Protex Fasteners Ltd, Worcestershire, United Kingdom, model number 98-651SS, and are made of T 304 stainless steel, except for the handle grip, which is usually a type of rubber.

Figure 15:
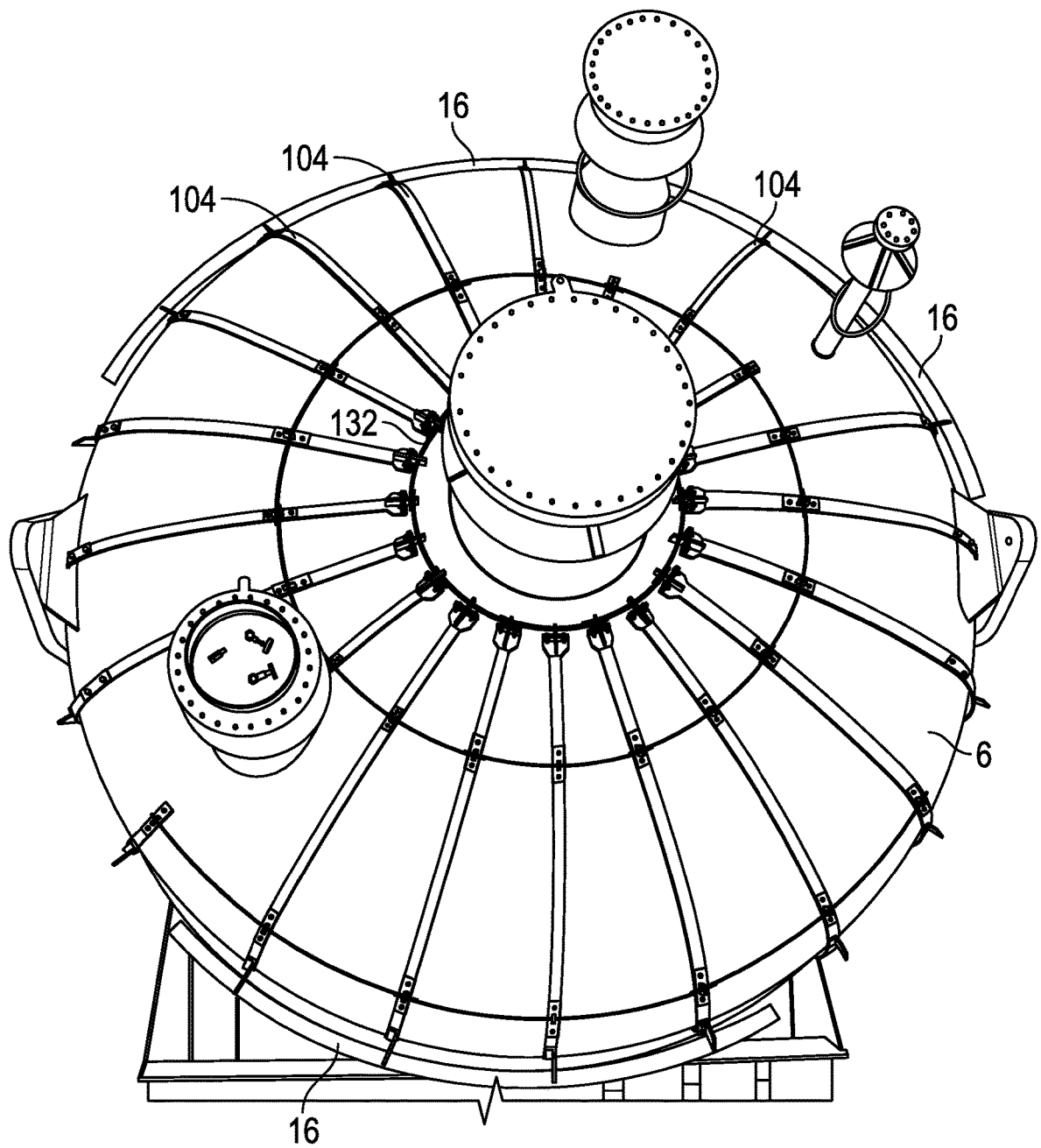
FIGS. 15-17 illustrate schematically certain details of another cage insulation panel support system for installing insulation panels on a coke drum.
Figure 16:
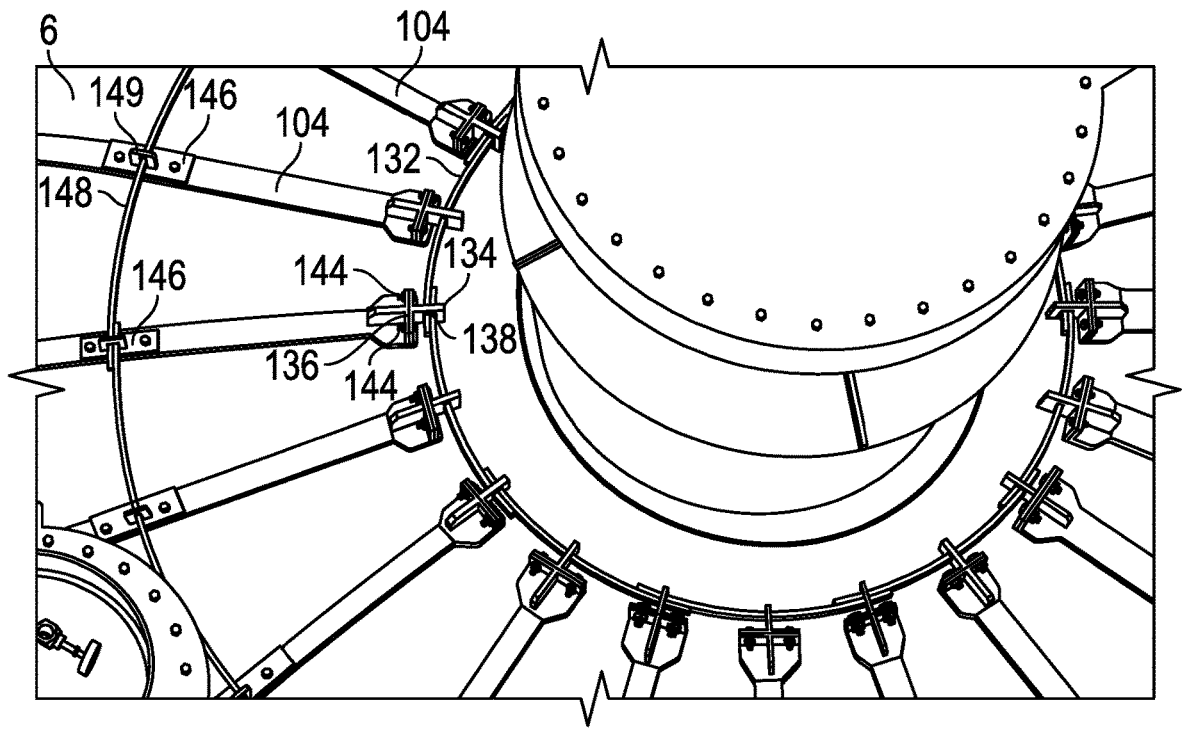
Figure 17:
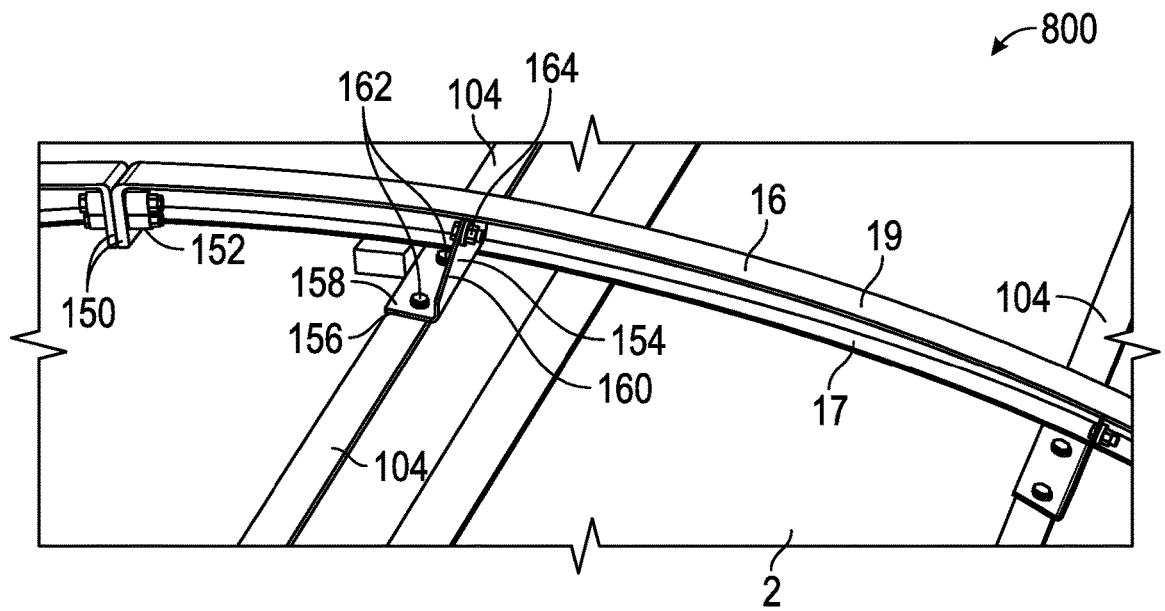

FIGS. 15-17 illustrate schematically certain details of cage-type insulation panel support systems of the present disclosure for installing insulation panels on a coke drum. FIG. 15 is a perspective view of a coke drum head 6, illustrating a plurality of steel bands or straps 104 that held in place by a collar cage cable 132, and lateral cage cables 148, as more generally viewable in the detailed perspective view of FIG. 16. FIG. 16 illustrates a plurality of upper flanges 134 and a corresponding plurality of lower flanges 136 bolted together by nuts and bolts 144. Upper flanges 134 include a through hole or eyelet 138 through which is placed cage collar cable 132. A plurality of plates 146 are bolted to bands 104 (plates 146 could be welded to bands 104). Each of plates 146 include an upstanding flange 149 that includes a through hole or eyelet through which cage lateral cables 148 are fitted. FIG. 17 is a perspective view of an embodiment 800 of a cage type insulation support system that includes a different shape "T-bracket" from that depicted in FIG. 11, but employ a plurality of steel bands 104 and insulation support rings 16 (only one of the latter being illustrated in FIG. 17). Embodiment 800 illustrates how the ends of insulation support rings may be bolted together employing end flanges 150 and bolt/washer/nut fasteners 152. The attachment of one location of insulation support ring 16 to one vertical steel band 104 is now described. A small steel square weldment 154 is welded to the underside of horizontal support ring 17 and the underside of vertical support ring 19. Steel square weldment 154 includes a through hole and nut/bolt/washer combination 164 that serves to fasten an upstanding flange 160 to weldment 154. Upstanding flange 160 is part of an angle 156, which includes a support plate 158 that is in turn bolted to steel band 104 as illustrated using a pair of nut/bolt/washer combinations 162.

The insulation systems disclosed of the present disclosure are the most advanced coke drum insulation panel systems available today, providing long-term maintenance-free thermal control, saving hundreds of thousands of dollars by not having to replace the system due to fastener failure, water intrusion and drum damage from expansion restriction or cold spots. Each insulation system may be pre-fabricated in a controlled factory setting to meet the highest quality control standard, and may therefore be custom engineered for specific pressure vessel size and structure restrictions. The metal jacket, especially when stainless steel such as 304, 316, or other, combined with a single-folded standing seam and weather shield combination, provides a weather proof, durable, maintenance-free coke drum insulation that allows thermal movement. The internal floating insulation support ring, or alternatively the cage support systems described herein, hold the insulation system off the pressure vessel exterior surface allowing pressure vessel wall movement without damaging the insulation. The screw attachment to the floating ring or cage and single-folded standing seams allow insulation panel removal and/or replacement during pressure weld seam inspection. The insulation panels may be designed and manufactured to allow ease of handling and thermal movement. The systems are designed to take in consideration the constant thermal expansion and contraction a coke drum goes through in its cycle, and may be installed on existing drums on a turn-around basis or on a totally new drum application. With each panel individually attached to the floating ring or cage elements, a single panel or complete row can be removed and replaced without involving the rest of the drum's panels after an in-service weld inspection. Stainless steel jacketing with single-folded standing seams and weather shields allows coke dust to be washed off of coke drums without compromising the efficiency of the insulation system.

The magnitude of lengths, thicknesses, diameters, and angles, illustrated in FIGS. 1-9 and 11-17 and discussed herein are typical and not meant to be limiting in any way, but are summarized in Table 1. Length dimensions to be noted are designated by the following designations: G, $L_1$, $L_2$, $L_3$, $L_4$, $L_5$, $L_6$, $L_7$, $L_8$, and $L_9$, where G is the distance that an innermost insulation layer stands off from the exterior surface of the pressure vessel, which is preferably no more than 4 inches for a coke drum, but could be more or less, depending on the pressure vessel or storage vessel, vessel contents, insulation material type and thickness, and heated air convection requirements. Thicknesses of note are designated $t_1$, $t_2$, $t_3$, $t_4$, and $t_5$, any of which may be thicker or thinner than listed depending on strength requirements. Furthermore, although the preferred insulating jacket metal for insulated coke drums is stainless steel, other metals and/or metal alloys could be used. Aluminum may be preferred for its low weight, although billet aluminum may be preferred for its strength and may weigh more than cast aluminum. Angle "β" is noted in embodiments 200 and 300 to be 90 degrees, but angle β could vary from 75 to about 135 degrees, or from 85 to 95 degrees.

TABLE 1

Dimensions and Angles[1]

| Dimension or angle | Broad Range (inch except where indicated) | Preferred Range (inch except where indicated) |
|---|---|---|
| G | up to 4 | up to 3 |
| $L_1$ (length of 18) | 3 to 6 | 4 to 5 |
| $L_2$ (length of 48) | 2 to 5 | 1 to 3 |
| $L_3$ (length of 17) | 3 to 6 | 4 to 5 |
| $L_4$ (length of 19) | 3 to 6 | 4 to 5 |
| $L_5$ (from 38 to 17) | 1.5 to 4.5 | 0.5 to 2.5 |
| $L_6$ (height of 18) | 3 to 6 | 4 to 5 |
| $L_7$ (length of 80) | 3 to 6 | 4 to 5 |
| $L_8$ (height of 18) | 3 to 6 | 4 to 5 |
| $L_9$ (length of 84) | 3 to 6 | 4 to 5 |
| Vertical height of slot 48 | $0.9 \times t_4$ | $0.7 \times t_4$ |
| $t_1$ (thickness of 36) | 2 to 4 mm | 2.5 to 3.5 mm |
| $t_2$ (thickness of 38) | 20 to 30 mm | 23 to 28 mm |
| $t_3$ (thickness of 19) | ¼ to ¾ | 5/16 to 11/16 |
| $t_4$ (thickness of 17) | ¼ to ¾ | 5/16 to 11/16 |
| $t_5$ (thickness of 18, 80) | | |
| D (internal diameter of coke drum) | 4 to 15 ft. | 4 to 9 ft. |
| H (height of coke drum straight section) | 20 to 30 ft. | 23 to 28 ft. |
| $d_1$ (diam. of 12) | 1.0 to 3.0 m | 1.0 to 2.0 m |
| $d_2$ (diam. of 10) | 0.2 to 0.8 m | 0.3 to 0.6 m |
| $d_3$ (diam. of 24) | $1.5 \times d_1$ | $1.33 \times d_1$ |
| $d_s$ (dist. between 18 or 80) | $0.25 \times \pi D$ | $0.1 \times \pi D$ |
| Angles (degrees) | | |
| α | 30 to 70 | 40 to 60 |
| β | 75 to 135 | 85 to 95 |
| γ | 45 to 90 | 60 to 80 |

[1]dimensions outside of these ranges may be acceptable

TABLE 2

Chemical Composition, wt. %, of MONEL ® Alloy 400

| | |
|---|---|
| Nickel (plus Cobalt) | 63.0 min. |
| Carbon | 0.3 max. |
| Manganese | 2.0 max. |
| Iron | 2.5 max. |
| Sulfur | 0.024 max. |
| Silicon | 0.5 max. |
| Copper | 28.0-34.0 |

TABLE 3

Physical Constants of MONEL ® Alloy 400[a]

| | | |
|---|---|---|
| Density, | g/cm³ | 8.80 |
| | lb/in.³ | 0.318 |
| Melting range, | ° F. | 2370-2460 |
| | ° C. | 1300-1350 |
| Modulus of Elasticity, | 10³ ksi | |
| | Tension | 26.0 |
| | Compression | 26.0 |
| | Torsion | 9.5 |
| Poisson's Ratio | | 0.32 |
| Curie Temperature, | ° F. | 70-120 |
| | ° C. | 21-49 |

[a]these values also apply to MONEL alloy R-405, the free-machining version of MONEL alloy 400.

TABLE 4

7 × 19 MONEL® 400 CABLE[1]

| Diameter (in.)[2] | Part Number[3] | Min. Breaking Strength (lbs.) | Approx. Weight Per 100 ft. |
|---|---|---|---|
| 3/32 | MC09479 | 480 | 1.8 |
| 1/8 | MC12579 | 875 | 3.3 |
| 5/32 | MC15679 | 1,350 | 5.2 |
| 3/16 | MC18879 | 1,950 | 7.5 |
| 7/32 | MC21979 | 2,650 | 10.5 |
| 1/4 | MC25079 | 3,500 | 13.5 |
| 9/32 | MC28179 | 4,400 | 17.0 |
| 5/16 | MC31379 | 5,450 | 21.0 |
| 3/8 | MC37579 | 7,850 | 30.0 |

[1]From Loos & Co., Inc., P.O. Box 98, Pomfret, CT 06258 (USA)
[2]Nominal Diameter excluding +/− tolerances
[3]Part numbers MC28179, MC31379, and MC37579 preferred for some coke drums, especially

TABLE 5

Chemical Composition, wt. %, of T304 and T316 SS

| | T304 | T316 |
|---|---|---|
| Carbon | 0.08 max. | 0.08 |
| Chromium | 18-20 | 18 max. |
| Manganese | 2.0 max. | 2 |
| Molybdenum | 0 | 3 max. |
| Iron | 66.345-74 | 62 |
| Nickel | 8-10.5 | 14 max. |
| Phosphorous | 0.045 max. | 0.045 |
| Sulfur | 0.03 max. | 0.03 |
| Silicon | 1 max. | 1 |

TABLE 6

Physical Constants of T304 and T316 SS

| | | T304 | T316 |
|---|---|---|---|
| Density, | g/cm$^3$ | 8 | 8 |
| | lb/in.$^3$ | 0.289 | 0.289 |
| Melting range, | °F. | 2550-2650 | 2500-2550 |
| | °C. | 1400-1455 | 1370-1400 |
| Modulus of Elasticity, 10$^3$ ksi | | 28-29 | 28 |
| Poisson's Ratio | | 0.29 | |
| CTE, linear 250° C. | | 9.89 µin/in-°F. | 9 µin/in-°F. |

Insulation materials useful in systems and methods of this disclosure should be durable, fire resistant, weatherproof, and of acceptable R-value depending on the heating or cooling duty, or capable of being modified or combined with other materials into a composite insulation material to acceptable R-values. Insultherm® Inc., assignee of the present application, uses a variety of insulation materials, depending on the type of project and insulation requirements, striving for optimum performance and to keep costs to a minimum. A variety of insulation products may be used, including aerogels, fiberglass (the glass fiber itself bonded together with thermosetting resin into a low density, lofty web, not glass fiber reinforced plastic), the thermoset foamed resin known under the trade designation POLYISO-FOAM, mineral wool, and the foamed glass product known under the trade designation FOAMGLAS®, These materials are discussed here briefly.

"Aerogel" is a generic word for a synthetic porous ultra-light material derived from a gel, in which the liquid component of the gel has been replaced with a gas. The result is a solid with extremely low density and low thermal conductivity. Aerogels may be based on alumina, chromia, tin dioxide, or carbon (such as aerographite and aerographene). The term "aerogel" does not have a designated material with set chemical formula but the term is used to group all the material with a certain geometric structure. Useful aerogels include those known under the trade designations PYROGEL® XT-E, PYROGEL® XT-F, and CRYOGEL® Z, available commercially from Aspen Aerogels °, Inc., Northborough, Mass. (U.S.A.) which manufactures flexible, durable industrial insulation products that meet the most demanding requirements and span service temperatures ranging from −460° F. (−270° C.) to 1200° F. (650° C.).

Fiberglass insulation is ideal for application in industrial heating and process equipment. Fiberglass insulation is manufactured from inorganic glass fibers bonded together with thermosetting resin in to a lofty mat. Fiberglass insulation can be used in plain or faced form. Faced fiberglass insulation is designed for systems that operate below ambient temperatures where vapor barrier protection is required. Fiberglass is available in a variety of densities for use on systems which operate up to 450° F. (232° C.). For faced products, surface temperature should not exceed 150° F. (66° C.). It can be readily cut with an ordinary knife and secured utilizing mechanical fasteners and/or adhesives.

Mineral wool insulation is made of inorganic fibers derived from rock, such as basalt, a volcanic rock, with a thermosetting resin binder. Advanced manufacturing technology ensures consistent product quality, with high fiber density and low shot content, for excellent performance in high temperature thermal control and fire resistance applications. Mineral wool provides excellent thermal insulation performance for mechanical, power and process systems operating from sub-ambient to 1200° F. (650° C.). Good thermal conductivity values help maximize control of heat loss, contributing to reduced operating costs and greater energy savings.

The cellular glass insulation known under the trade designation FOAMGLAS®, available from Pittsburgh Corning Corporation, Pittsburgh, Pa., U.S.A., is another insulation product that may be used in insulation systems of the present disclosure. This product comprises millions of sealed glass cells, is lightweight, rigid, and manufactured in block form, then fabricated into a wide range of shapes and sizes. The material exhibits constant insulating efficiency, is noncombustible, non-absorbent, impermeable to water and water vapor, and corrosion/chemical resistant, According to the manufacturer, this product can be certified to conform to the requirements of ASTM C552 (Standard Specification for Cellular Glass Thermal Insulation (Grade 6)).

Composite insulation materials may be used in insulation systems of the present disclosure. Composite insulation is the combination of any of the insulation products mentioned herein to create a custom insulation panel. Due to height and weight of the panel, temperature of the pressure vessel or storage vessel to be insulated, and thermal conservation, specific insulation properties are required. The edition of a single layer of polyiso material to a fiberglass or mineral wool panel adds rigidity, strength, prevents "oil canning", and maintains non-combustible requirements.

The metal outer shell or jacket, combined with the single-folded standing seams and rain shields, provides a weatherproof, durable maintenance-free insulation/fire protection system. The weather shields weatherproof the single-folded standing seams between panels, rather than rolled-over standing seams of the previous techniques. The internal anchor system of insulation support members or clips described herein features horizontal cables that are easily applied circumferentially around the pressure vessel or storage vessel, eliminating external bands.

For pressure vessels other than coke drums or other pressures operating at temperatures where a coke drum operates, one type of insulation jacketing that may be used in the panel system is the 0.024 inch thickness, stucco embossed mill finished or polyester coated aluminum. A variety of thickness, widths, and colors are available depending on customer specifications. Panels may range in width from 1 ft. to 3 ft., or from 1.5 ft. to 2 ft., and may be customized to fit the pressure vessel height. Panels using this jacketing material meet the requirements of ASTM B-209 3105-H14 (Standard Specification for Aluminum and Aluminum-Alloy Sheet and Plate). Another type of insulation jacketing that may be used in the panel system for pressure vessels not operating at coke drum temperatures is GALVALUME®, a 55% aluminum-zinc alloy coated sheet steel product that is ideally suited for most types of insulation panels. A variety of thickness, widths, and colors are available depending on customer specifications, Panels may range in width from 1 ft. to 3 ft., or from 1.5 ft. to 2 ft, and may be customized to fit the pressure vessel height. Panels using this jacketing material meet the requirements of ASTM 792.

Stainless steel is presently the most common jacketing used in the panel system for coke drums and spheres (spherical pressure vessels). It is recommended for application in which the tank or vessel will be housing a highly caustic or corrosive material. It can be stucco embossed or smooth finish, and comes in a variety of thickness and widths. Custom paint colors can be applied to meet customer specifications. Panels using this jacketing material meet the requirements of ASTM A480 (Standard Specification for General Requirements for Flat-Rolled Stainless and Heat-Resisting Steel Plate, Sheet, and Strip).

From the foregoing detailed description of specific embodiments, it should be apparent that patentable apparatus, combinations, and methods have been described. Although specific embodiments of the disclosure have been described herein in some detail, this has been done solely for the purposes of describing various features and aspects of the apparatus, combinations, and methods, and is not intended to be limiting with respect to their scope. Systems and methods of the disclosure may be used during the storage of chemicals, oil, gas, asphalt, brewery, and food products. It is contemplated that various substitutions, alterations, and/or modifications, including but not limited to those implementation variations which may have been suggested herein, may be made to the described embodiments without departing from the scope of the appended claims.

What is claimed is:

1. A method of insulating a vessel comprising:
   (a) attaching an insulation support structure selected from a floating ring system and a cage system to an external surface of the vessel, the insulation support structure configured to allow the vessel to expand and contract without damage to the vessel;
   (b) attaching a plurality of insulation panels to the insulation support structure; and
   (c) securing the plurality of insulation panels to the insulation support structure and to the vessel by forming a plurality of standing seams between adjacent insulation panels, forming an eyelet through-hole in a lower section of each standing seam, and tensioning a plurality of external insulation securing cables, each of the cables routed through respective horizontally aligned eyelets in each standing seam external of the insultation panels, and tensioning each of the external insulation securing cables to at least 450 lb, wherein each of the insulation securing cables is constructed of a material selected from a group consisting of stainless steel and a solid-solution alloy having a melting point range of 2370 to 2460° F. (1300 to 1350° C.), the solid-solution alloy consisting essentially of from 28 to 34 percent copper, a minimum of 63 percent nickel, a maximum of 2.0 percent manganese, a maximum of 2.5 percent iron, a maximum of 0.3 percent carbon, a maximum of 0.024 percent sulfur, and a maximum of 0.5 percent silicon.

2. The method of claim 1 further comprising installing a plurality of weather shields on a top of one or more of said standing seams.

3. A method of insulating a coke drum comprising:
   (a) attaching an insulation support structure selected from a floating ring system and a cage system to an external surface of the coke drum, the insulation support structure configured to allow the coke drum to expand and contract without damage to the coke drum;
   (b) attaching a plurality of insulation panels to the insulation support structure; and
   (c) securing the plurality of insulation panels to the insulation support structure and to the coke drum by forming a plurality of standing seams between adjacent insulation panels, forming an eyelet through-hole in a lower section of each standing seam, and tensioning a plurality of external insulation securing cables, each of the cables routed through respective horizontally aligned eyelets in each standing seam external of the insultation panels, wherein each of the insulation securing cables is constructed of a material selected from a group consisting of stainless steel and a solid-solution alloy having a melting point range of 2370 to 2460° F. (1300 to 1350° C.), the solid-solution alloy consisting essentially of from 28 to 34 percent copper, a minimum of 63 percent nickel, a maximum of 2.0 percent manganese, a maximum of 2.5 percent iron, a maximum of 0.3 percent carbon, a maximum of 0.024 percent sulfur, and a maximum of 0.5 percent silicon.

4. The method of claim 3 further comprising installing a plurality of weather shields on a top of one or more of said standing seams.

5. The method of claim 3, wherein the insulation support structure is a floating ring system installed by:
   i) welding a series of spaced apart weldments to the coke drum exterior surface in spaced apart horizontal rows, and
   ii) positioning a plurality of vertically spaced horizontal insulation support rings supported by but not attached to the weldments, each insulation support ring having a diameter greater than an external diameter of the coke drum.

6. The method of claim 5, wherein each of the weldments are rectangular planar metal plates, and the welding comprises positioning each of the rectangular metal plates vertically and extending perpendicular to the exterior surface of the coke drum, and welding each of the vertically positioned, perpendicularly extending rectangular plates to the exterior surface of the coke drum.

7. The method of claim 5, wherein each of the weldments are rectangular planar metal plates having a same thickness, and the welding comprises positioning each of the rectangular metal plates vertically and extending perpendicular to the exterior surface of the coke drum, and welding each of the vertically positioned, perpendicularly extending rectangular plates to the exterior surface of the coke drum, wherein each of the vertical, rectangular, planar metal plates are selected from the group consisting of:
- i) metal plates comprising an upper planar member and a lower planar member having a common base welded to the exterior surface of the coke drum, the upper and lower planar members separated by a horizontal slot; and
- ii) solid metal plates devoid of slots or other passages.

8. The method of claim 5, wherein the positioning of the plurality of vertically spaced horizontal insulation support rings comprises:
- i) attaching a horizontal insulation support ring distal edge to a top edge of a downward extending vertical ring, the horizontal insulation support ring having a width sufficient to support upwardly extending insulation panels, and the downward extending vertical ring having a height sufficient to secure an upper portion of downwardly extending insulation panels, and
- ii) securing, using a plurality of threaded members, the downward extending vertical ring to the upper portion of the downwardly extending insulation panels.

9. The method of claim 7 further comprising welding anti-rotation members to an under-side of at least some of the horizontal insulation support rings in the vicinity of at least some of a first portion of the vertical, rectangular, planar metal plates, the anti-rotation members configured to resist rotation of the horizontal insulation support rings about an axis perpendicular to a longitudinal axis of the coke drum and running through the horizontal slot.

10. The method of claim 5 further comprising cutting wedge-shaped cut-outs serving as guides in at least some of the horizontal insulation support rings, each of the wedge-shaped cut-outs adapted to mesh with an upper portion of one of the series of spaced apart weldments, the wedge-shaped cut-outs positioned about the horizontal insulation support rings where the horizontal insulation support rings and the series of spaced apart weldments mesh.

11. The method of claim 3, wherein the attaching of the plurality of the insulation panels to the insulation support structure comprises attaching insulation panels comprising insulation material selected from a group consisting of aerogel, glass fiber, mineral fiber, cellular glass foam, polyisocyanurate foam, and combinations and composites thereof.

12. The method of claim 3, wherein the attaching of the plurality of the insulation panels to the insulation support structure comprises attaching insulation panels comprising an exterior metal jacket selected from a group consisting of aluminum sheet, stainless steel sheet, sheets of alloys of zinc and aluminum, and combinations and composites thereof.

13. The method of claim 3 further comprising securing an upper portion of each of the plurality of insulation panels to the insulation support structure using a plurality of threaded members.

14. The method of claim 3 further comprising tensioning each of the external insulation securing cables to at least 450 lb.

15. The method of claim 3 further comprising welding a plurality of vertical, rectangular, planar metal plates extending perpendicular to the exterior surface of the coke drum, each of the plurality of vertical, rectangular, planar metal plates having the same thickness and devoid of slots or other passages, and fastening a plurality of heat containment shields positioned circumferentially about the exterior surface of the coke drum to prevent convection of heated air generally upward about the exterior surface of the coke drum in gaps between the coke drum exterior surface and the insulation panels, each heat containment shield comprising an insulated sheet metal ring upright portion, and a non-insulated sheet metal ring shank attached to an underside of a horizontal portion of the horizontal insulation support ring.

16. The method of claim 3 further comprising connecting a plurality of rain shields at a top terminus of each standing seam, the rain shields each comprising a backer plate having a central slot extending from a bottom of the backer plate and up a length short of a top of the backer plate, and a nose plate having a nose section and left and right side wings extending generally perpendicularly away from the nose section, the nose plate further having a top extension generally in a plane of the left and right side wings, the nose section configured to extend through the slot of the backer plate when the nose plate is positioned behind and the left and right side wings and top extension are adjacent a back surface of the backer plate,
- spot welding the top extension to the backer plate and an underlying exterior metal sheet of one of the insulation panels, and
- securing the backer plate and nose section to underlying adjacent insulation panels using threaded members, the nose sections covering the top terminus of the standing seam.

17. The method of claim 3 wherein the insulation support structure is a cage system installed by:
- i) providing an insulation support system comprising a plurality of vertically spaced insulation support rings supported by a plurality of laterally spaced apart brackets, securing each bracket to one of a plurality of vertical steel bands, and securing the vertical steel bands near a top of the coke drum by a collar;
- ii) securing a plurality of insulation panels to the insulation support rings, each insulation panel comprising insulation material and an exterior metal jacket, each insulation panel positioned between horizontally adjacent insulation panels with standing seams.

* * * * *